United States Patent [19]

Carroll et al.

[11] Patent Number: 4,645,920
[45] Date of Patent: Feb. 24, 1987

[54] EARLY FAULT DETECTION IN AN OPTO-MATRIX TOUCH INPUT DEVICE

[75] Inventors: Arthur B. Carroll, Georgetown; John K. Carstedt, Round Rock, both of Tex.

[73] Assignee: Carroll Touch, Inc., Round Rock, Tex.

[21] Appl. No.: 666,949

[22] Filed: Oct. 31, 1984

[51] Int. Cl.[4] .......................... G01V 9/04; H01J 40/14
[52] U.S. Cl. .................................. 250/221; 250/222.1
[58] Field of Search ...................... 250/221, 222.1, 209; 340/555, 557

[56] References Cited

U.S. PATENT DOCUMENTS

| | | | |
|---|---|---|---|
| 3,764,813 | 10/1973 | Clement et al. | 250/221 |
| 3,970,846 | 7/1976 | Schofield, Jr. et al. | 250/221 |
| 4,243,879 | 1/1981 | Carroll et al. | 250/221 |
| 4,266,124 | 5/1981 | Weber et al. | 250/221 |
| 4,267,443 | 5/1981 | Carroll et al. | 250/221 |
| 4,313,109 | 1/1982 | Funk et al. | 250/221 |
| 4,384,201 | 5/1983 | Carroll et al. | 250/221 |

Primary Examiner—David C. Nelms
Assistant Examiner—Michael Messinger
Attorney, Agent, or Firm—Robert W. Pitts; Don M. Boles

[57] ABSTRACT

An opto-matrix touch input device which samples and compares beam readings is taught. Briefly stated, phototransistor readings which sample ambient light as well as light from an associated light emitting diode are compared with preset values. If the readings from the phototransistor are below a certain level, then the phototransistor/LED pair are flagged as bad. If the readings are within preset limits, yet below nominal values, then the phototransistor/LED pair are flagged as indicating a marginal beam. In this manner a trouble report may be generated for the purpose of repair or investigation as well as providing a vehicle for keeping a history of the opto-matrix frame condition and thereby a method of early fault detection.

5 Claims, 19 Drawing Figures

EARLY FAULT DETECTION IN AN OPTO-MATRIX TOUCH INPUT DEVICE

BACKGROUND OF THE INVENTION

The invention relates, generally, to a touch input device and, more particularly, to an opto-matrix frame having early component degradation tracking and warning.

Coincident with the use of video displays has always been the problem of the man/machine interface. Traditionally, control of displayed information or cursors has been via a keyboard. Recently, however, a number of devices have been introduced which allow an operator to directly interact with the video display. These types of devices have included light pens, desk-type mouse controllers, or touch input devices such as a switch matrix or opto-electronic matrices. While generally switch-type overlays which are placed adjacent a video display are inexpensive to apply and utilize, they are generally susceptible to contact wear as well as distortion of the video information which is presented to the viewer, particularly in high usage environments. However, since opto-matrix schemes utilize light, which is generally in the infrared region, the switch matrix presented by the light beams is invisible to the viewer and, therefore, does not distort the video information displayed to the viewer and is not subject to wear in high usage environments. A number of schemes which utilize opto-matrix frames may be found in U.S. Pat. No. 4,267,443 "Photoelectric Input Apparatus", issued May 12, 1981 to Carroll et al; U.S. Pat. No. 4,243,879 "Touch Panel with Ambient Light Sampling", issued Jan. 6, 1981 to Carroll et al; and U.S. Pat. No. 3,764,813 "Coordinate Detection System", issued Oct. 9,1973 to Clement et al. These three schemes address problems inherent with opto-matrix devices such as increasing frame resolution without a corresponding increase in components, surrounding or ambient light compensation, or optimization of emitter/detector driving and detecting networks respectively.

Another problem inherent in opto-matrix frames is the detection of bad or marginal components which tend to indicate that a stylus hit has occurred. This may occur where an emitter or detector or circuitry associated therewith has failed thereby not producing or registering light with the result that the decoding circuitry sees the absence of light as a stylus hit. This therefore results in a false condition. Another problem is where devices degrade or there is a buildup of dirt and oils on the bezel or the face of the emitter or detector. Generally, this condition will cause increasing amounts of false readings or may be a prelude to component failures. Accordingly, it is desirable to have a scheme which keeps track of apparent component failure or of impending component degradation and failure. Additionally, it is also desirable to have a scheme which flags or registers these degradations of failures before or as close to the time of failure as is practicable. Such a scheme is taught by the present invention.

Accordingly, it is desirable to have and as an object of the present invention, an opto-matrix touch input device having fault detection, comprising a four-sided frame, optical emitters disposed in two adjacent sides of the frame, optical detectors disposed in the two sides of the frame opposite the emitters, a sampling device for sequentially sampling the light received by the detectors, a converter for converting the value of the light received by the detectors to a digital value and a processor connected to the converter for comparing the output of the detector prior to and/or during and/or after energization of a corresponding emitter, thereby deriving a signal manifesting either the absence or inadequacy of output of a detector thereby indicating a failed emitter and/or corresponding detector or components associated therewith or a marginal emitter and/or corresponding detector or components associated therewith.

BRIEF DESCRIPTION OF THE DRAWINGS

Reference is now made to the accompanying drawings in which.

DESCRIPTION OF THE PREFERRED EMBODIMENT

Construction of the Present Device

Figure 1:
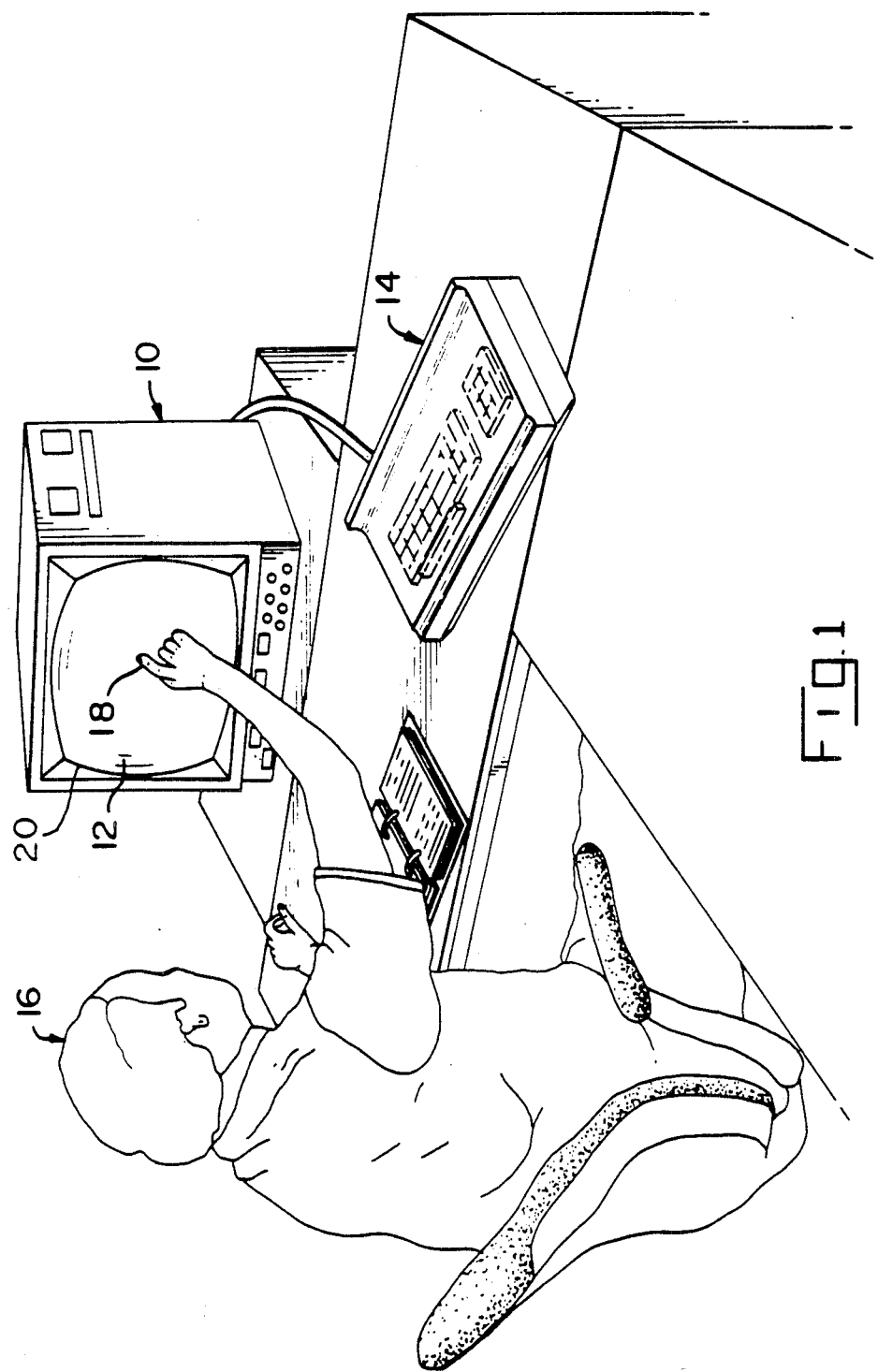
FIG. 1 is a representative view of an operator utilizing a video display.

Referring now to FIG. 1, there is illustrated a representative view of an operator utilizing a video display. Shown is a CRT 10 having a display area 12 and which generally interacts with a keypad or keyboard 14. An operator 16 interacts with the display area 12 through the use of the stylus 18, which in the preferred embodiment of the present invention, is the finger of the operator thereby presenting a truly touch-type interactive system. It is to be understood, however, that other types of styli can and may be used without departing from the spirit and scope of the present invention such as, for example, pencils, pointers, or other similar types of apparatus. While the keypad 14 is shown, it is one of the primary objects of the present invention to utilize the keypad 14 as little as possible, if at all, with the operator 16 utilizing the stylus 18 for direct interaction with the CRT. A touch input area is generally defined by what the operator 16 sees in the display area 12. In the preferred embodiment of the present invention, this touch area utilizes emitters which are disposed on the bottom and one side of the display with detectors located on the top and opposite side thereby forming an infrared light beam matrix (shown more clearly in FIG. 5). The light beams (not shown) shine through the bezel 20 which is disposed around the edge of the CRT 10 and which, in the preferred embodiment of the present invention, is opaque to visible light but transparent to infrared light. It is to be understood, however, that other types of bezels which exhibit different types of light transmission properties may be utilized.

Figure 2:
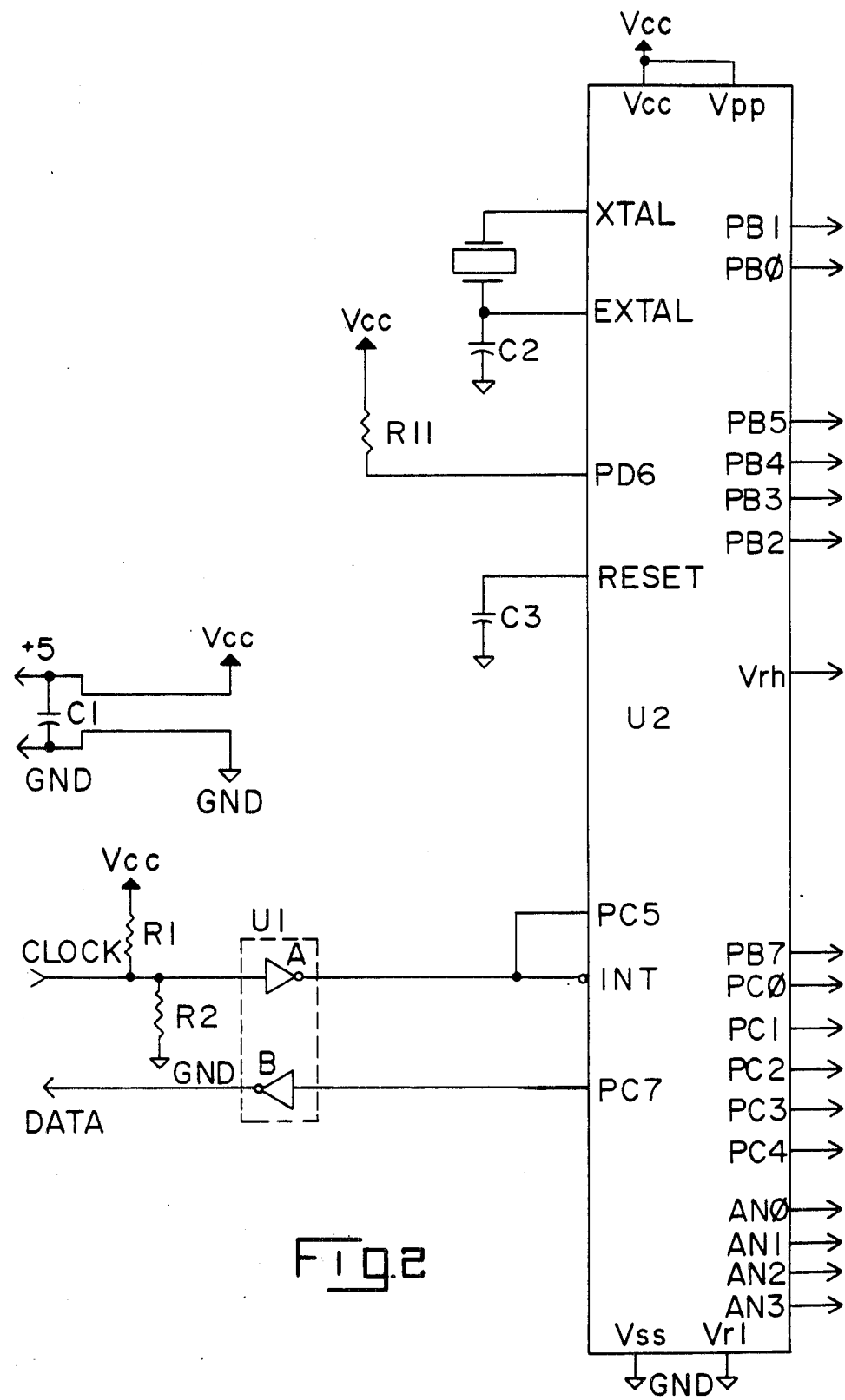
FIGS. 2, 3 and 4 form a complete schematic diagram for use in conjunction with the touch input entry device of the present invention.
Figure 3:
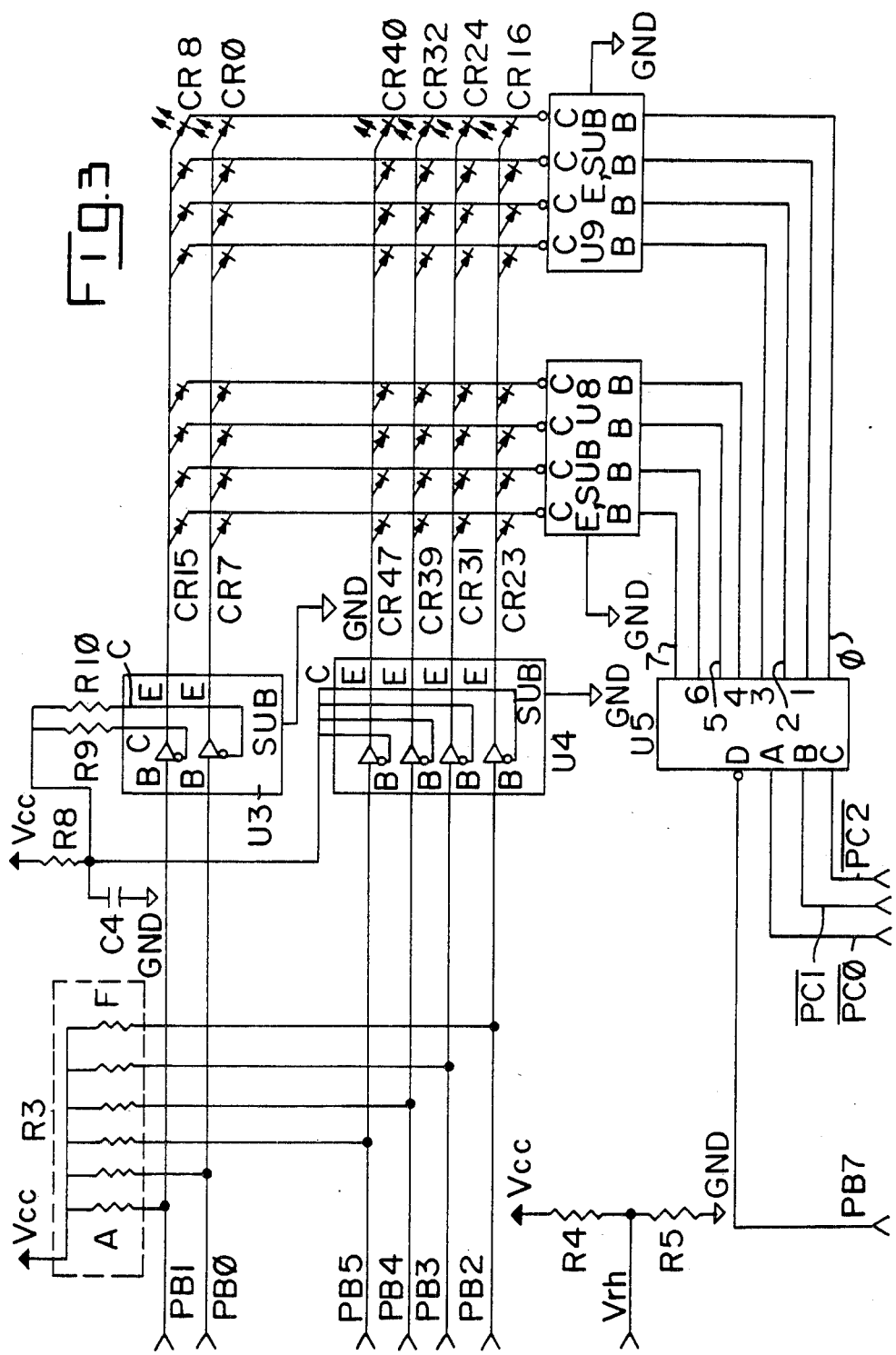
Figure 4:
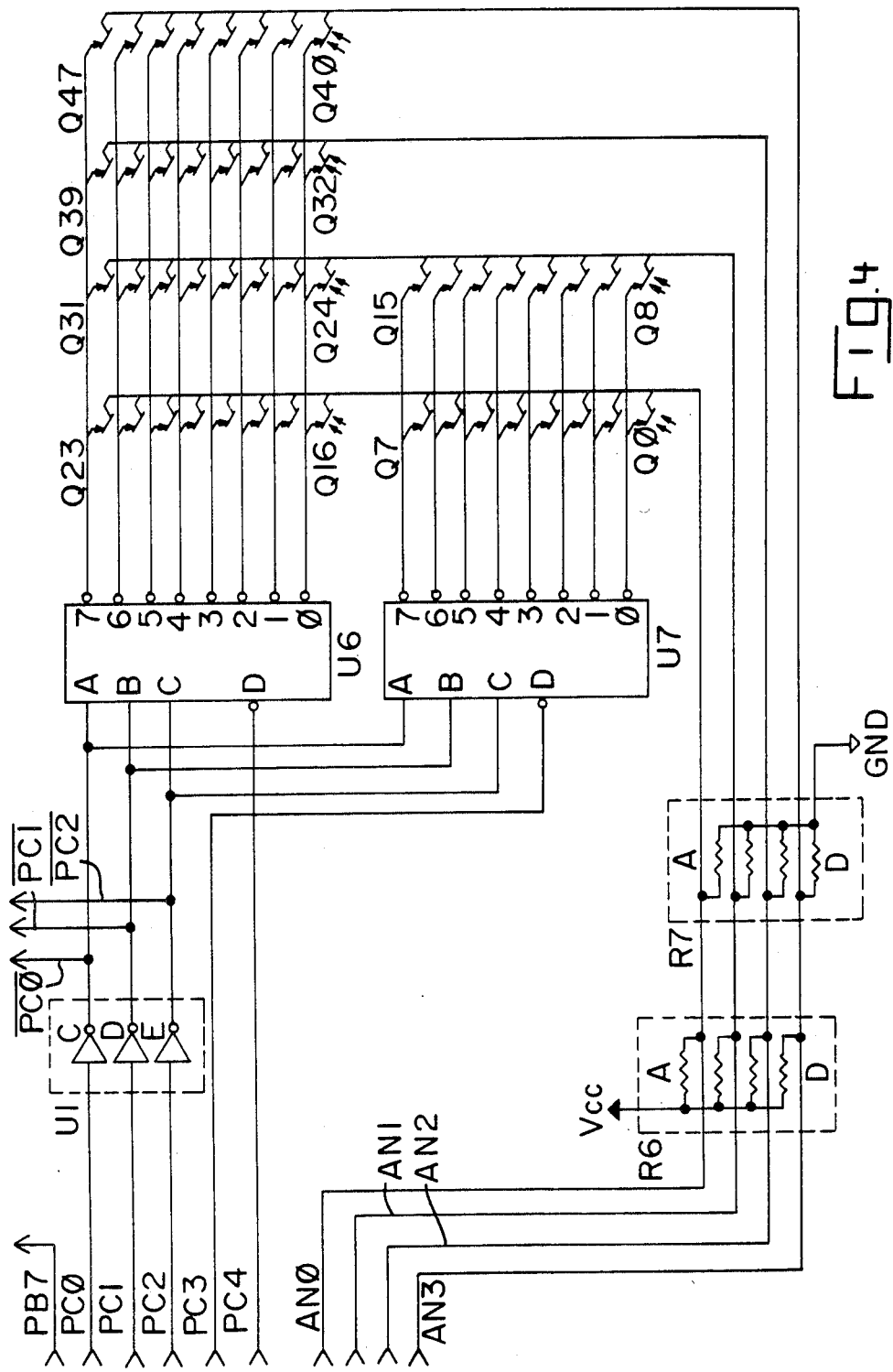

Referring now to FIGS. 2, 3 and 4, there is illustrated a schematic for the present invention. A list of the major component designations and functions is shown in Table I below.

TABLE 1

| Component Number | Component Type |
| --- | --- |
| U1 | Schmidt Trigger Inverter |
| U2 | Microprocessor |
| U3, U4, U8, J9 | Darlington Transistor Array |
| U5, U6, U7 | BCD-to-Decimal Decoder |
| CR0-CR47 | Light Emitting Diodes (Emitters) |
| Q0-Q47 | Phototransistors (Detectors) |

Also shown is a microprocessor U2 which, in the preferred embodiment of the present invention, is a 8-bit microcomputer having on-board analog-to-digital converter as well as RAM and ROM, and is an HMOS device preferably of the 6800 family of microcomputers produced by companies such a Motorola of Austin, Tex. It is to be understood, however, that other types of microcomputers can be utilized which may be CMOS or NMOS and which have been produced by other manufacturers having different bit-byte configurations such as 16 or 32-bit bytes. These machines like the preferred 6800 family architecture are readily known and available to one skilled in the art. The design of the present invention does not require the use of all features and pins attendant to the U2 microprocessor and therefore only those utilized will be discussed and are shown. The Vcc terminal is connected to Vcc power which, in the preferred embodiment of the present invention, is +5 Volts and is also connected to terminal Vpp. Vcc supplies operating power to most of the microprocessor U2 while Vpp supplies the programming voltage for the ROM memory in the microprocessor U2 which, in the preferred embodiment of the present invention, is EPROM, although it is to be understood that masked versions of the microprocessor may be utilized with the result that Vpp is no longer necessary. The XTAL and EXTAL terminals have a crystal disposed therebetween with the EXTAL terminal having one terminal of capacitor C2 connected thereto with the remaining terminal of capacitor C2 connected to Ground (Gnd). This thereby provides a stabilized clock frequency for the entire system of the present invention. The RESET terminal is connected to one terminal of capacitor C3 with the remaining terminal of capacitor C3 also connected to Gnd. Terminal PC5, which is an I/O pin, is connected to the interrupt terminal INT and is connected to the output of the A inverter of device U1 which is a Schmidt-type trigger inverter with the input to inverter A of component U1 being connected to one terminal of R1 and one terminal of R2 as well as to the clock terminal which is thereafter provided by a host computer (not shown). The remaining terminals of R1 and R2 are connected to Vcc and Gnd respectively. The I/O pin PC7 is connected to the input of the B inverter of device U1 with the output of the B inverter of device U1 being a data output terminal which is also connected to a host computer (not shown). Also shown on FIG. 2 is capacitor C1 which acts as a filtering capacitor and is connected such that one capacitor is attached to the +5 or Vcc bus with the other terminal attached to the Gnd bus. Port B I/O lines PB0, PB1, PB2, PB3, PB4, PB5 and PB7 provide coding and decoding for the emitters and detectors of the present invention as shown more clearly in FIGS. 3 and 4. Pin Vrh is a voltage reference high pin which provides the high voltage reference for the analog/digital conversion portion of the microprocessor U2. The Vrl pin is a voltage reference low pin which provides the low reference voltage for the analog-to-digital portion of the microprocessor U2. Port C terminals PC0, PC1, PC2, PC3 and PC4 are I/O pins which interconnect with the coding and decoding of the emitter/detector array as shown more clearly in FIGS. 3 and 4. Analog-to-digital terminals AN0, AN1, AN2 and AN3 are interconnected with the detection circuitry as shown more clearly in FIG. 4. The Vss terminal of the microprocessor U2 is connected to Gnd, while I/O pin PD6 is connected to one terminal of resistor R6. The remaining terminal of resistor R6 is connected to Vcc.

Referring now to FIG. 3, the emitter portion of the present invention is shown. The PB0 line is connected to one terminal of resistor B of resistor network R3 as well as to the base terminal of one of the Darlington transistor pairs of component U3, a Darlington transistor array, while I/O line PB1 is connected to resistor A of resistor network R3 which is in turn connected to the base of another Darlington transistor pair of component U3. Similarly, I/O lines PB2, PB3, PB4 and PB5 are connected to resistors F, E, D and C respectively of resistor network R3 as well as to a base terminal of the Darlington transistor pair contained in component U4, also a Darlington transistor array. The remaining terminals of transistors A, B, C, D, E and F of resistor network R3 are tied together and thereafter to Vcc. The Vrh line is connected to one terminal of resistors R4 and R5 with the remaining terminals of resistors R4 and R5 being connected to Vcc and Gnd respectively. The I/O line PB7 is connected to the D input of component U5 which is a binary coded decimal (BCD) to decimal decoder while PC0, PC1 and PC2 (supplied by component U1, not shown) are connected to the A, B and C inputs respectively of decoder U5. The collector terminal associated with the Darlington transistor pair for I/O line PB0 is connected to one terminal of resistor R10 while the collector terminal associated with the Darlington pair for I/O line PB1 is connected to one terminal of resistor R9. The remaining terminals of resistor R9 and R10 are thereafter connected to each other and to one terminal of resistor R8 and capacitor C4 as well as to all four of the collector terminals associated with the Darlington transistor array U4. The remaining terminal of resistor R8 is connected to Vcc while the remaining terminal of capacitor C4 is connected to Gnd. The SUB terminals of Darlington transistor arrays U3 and U4 are connected to Gnd. The emitter terminal of the Darlington transistor pair associated with I/O line PB0 of component U3 is connected to the anode of emitters CR0, CR1, CR2, CR3, CR4, CR5, CR6 and CR7 while similarly the emitter of component U3 which is associated with the I/O line PB1 is connected to the anode of emitters CR8 through CR15. The emitters in the preferred embodiment of the present invention are infrared light emitting diodes although it is to be understood that other types of emitters can and may be utilized without departing from the spirit and scope of the present invention. Similarly, the emitter terminals associated with I/O lines PB2, PB3, PB4 and PB5 of Darlington transistor array U4 are connected to the anodes of emitters CR16-23, CR24-31, CR32-39 and CR40-47 respectively. The anodes of emitters CR7, CR15, CR23, CR31, CR39 and CR47 are connected to the collector terminal of one of the Darlington transistor pairs of U8 which is also a Darlington transistor array with the base terminal associated with this Darlington transistor pair being connected to terminal 7 of U5, a BCD-to-decimal decoder. Similarly, the cathodes of emitters CR6, CR14, CR22, CR30, CR38 and CR46 are connected to the collector terminal of another Darlington transistor pair of component U8 with the base terminal associated therewith being connected to output pin 6 of decoder U5. The cathodes of emitters CR5, CR13, CR21, CR29, CR37, and CR45 are connected to the collector terminal of a Darlington transistor pair of component U8 with the base terminal associated therewith being connected to pin 5 of decoder U5. The cathode terminals of emitters CR4, CR12, CR20, CR28, CR36 and CR44 are connected to the collector terminal of another Darlington transistor pair of array U8 with the base terminal associated therewith being connected to output pin 4 of decoder U5. The cathodes of emitters CR3, CR11, CR19, CR27, CR35 and CR43 are connected to the collector terminal of a Darlington transistor pair from component U9 which is another Darlington transistor array with the base terminal associated therewith being connected to output pin 3 of decoder U3. The cathodes of emitters CR2, CR10, CR18, CR26, CR34 and CR42 are similarly connected to a collector terminal of another Darlington transistor pair of array U9 with the base terminal associated therewith being connected to terminal 2 of decoder U5. The cathodes of emitters CR1, CR9, CR17, CR25, CR33 and CR41 are connected to the collector terminal of another Darlington transistor pair of array U9 with the base terminal associated therewith being connected to output pin 1 of decoder U5. The cathodes of emitters CR0, CR8, CR16, CR24, CR32 and CR40 are connected to the collector of another Darlington transistor pair contained in array U9 with the base terminal associated therewith being connected to output pin 0 of decoder U5. The emitter terminals and SUB terminals of array U8 are connected together and thereafter to Gnd while, similarly, the emitter and SUB terminals of array U9 are also connected togther and thereafter to Gnd. Accordingly, through the use of arrays U3, U4, U8 and U9, the emitters CR0 through CR47 are connected so as to form a matrix (the operation of which will be described more fully below).

Referring now to FIG. 4, there is shown the detection and decoding circuitry associated with the detectors of the present invention. The I/O line PC0 is connected to the input of inverter C of component U1 while, similarly, I/O lines PC1 and PC2 are connected to the input of inverters D and E of component U1. This thereby produces PC0, PC1 and PC2 which is connected to terminals A, B and C respectively of decoder U5 (previously mentioned) as well as to terminals A, B and C respectively of binary coded decimal-to-decimal decoders U6 and U7. Port C I/O line PC3 is connected to the D terminal of decoder U7 while I/O terminal PC4 is connected to the D terminal of decoder U6. Analog-to-digital I/O line AN0 is connected to one terminal of the A resistors of transistor arrays R6 and R7 and thereafter to the collector terminals of the phototransistors or detectors Q0, Q1, Q2, Q3, Q4, Q5, Q6, Q7 and Q16, Q17, Q18, Q19, Q20, Q21, Q22, Q23. Digital I/O line AN1 is similarly connected to one terminal of the B resistors of resistor networks R6 and R7 and thereafter connected to the collectors of detectors Q8 through Q15 and Q24 through Q31. The digital I/O line AN2 is connected to one terminal of the C resistors of resistor networks R6 and R7 and thereafter to the collectors of the detectors Q32 through Q39. Similarly, the I/O line AN3 is connected to one terminal of the D resistors of the resistor networks R6 and R7 and thereafter to the collectors of detectors Q40 through Q47. The remaining terminals of resistors A, B, C and D of R6 are connected together and thereafter to Vcc while the remaining terminals of resistors A, B, C and D of resistor network R7 are similarly connected together and thereafter to Gnd. The output pin 0 of decoder U7 is connected to the emitter terminals of detectors Q0 and Q8 while similarly the paired emitter terminals of detectors Q1 and Q9, Q2 and Q10, Q3 and Q11, Q4 and Q12, Q5 and Q13, Q6 and Q14, Q7 and Q15 are connected together and thereafter to terminals 1, 2, 3, 4, 5, 6 and 7 respectively of decoder U7. Additionally, the emitters of detectors Q16 and Q24 and Q32 and Q40 are connected together thereafter being connected to terminal 0 of decoder U6 while, similarly, the four emitters from detectors Q17 and Q25 and Q33 and Q41, Q18 and Q26 and Q34 and Q42, Q19 and Q27 and Q35 and Q43, Q20 and Q28 and Q36 and Q44, Q21 and Q29 and Q37 and Q45, Q22 and Q30 and Q38 and Q46, Q23 and Q31 and Q39 and Q47 are connected together and thereafter to terminals 1, 2, 3, 4, 5, 6 and 7 respectively of decoder U6. This thereby creates a matrixing scheme similar to that of the detectors of FIG. 3.

Figure 5:
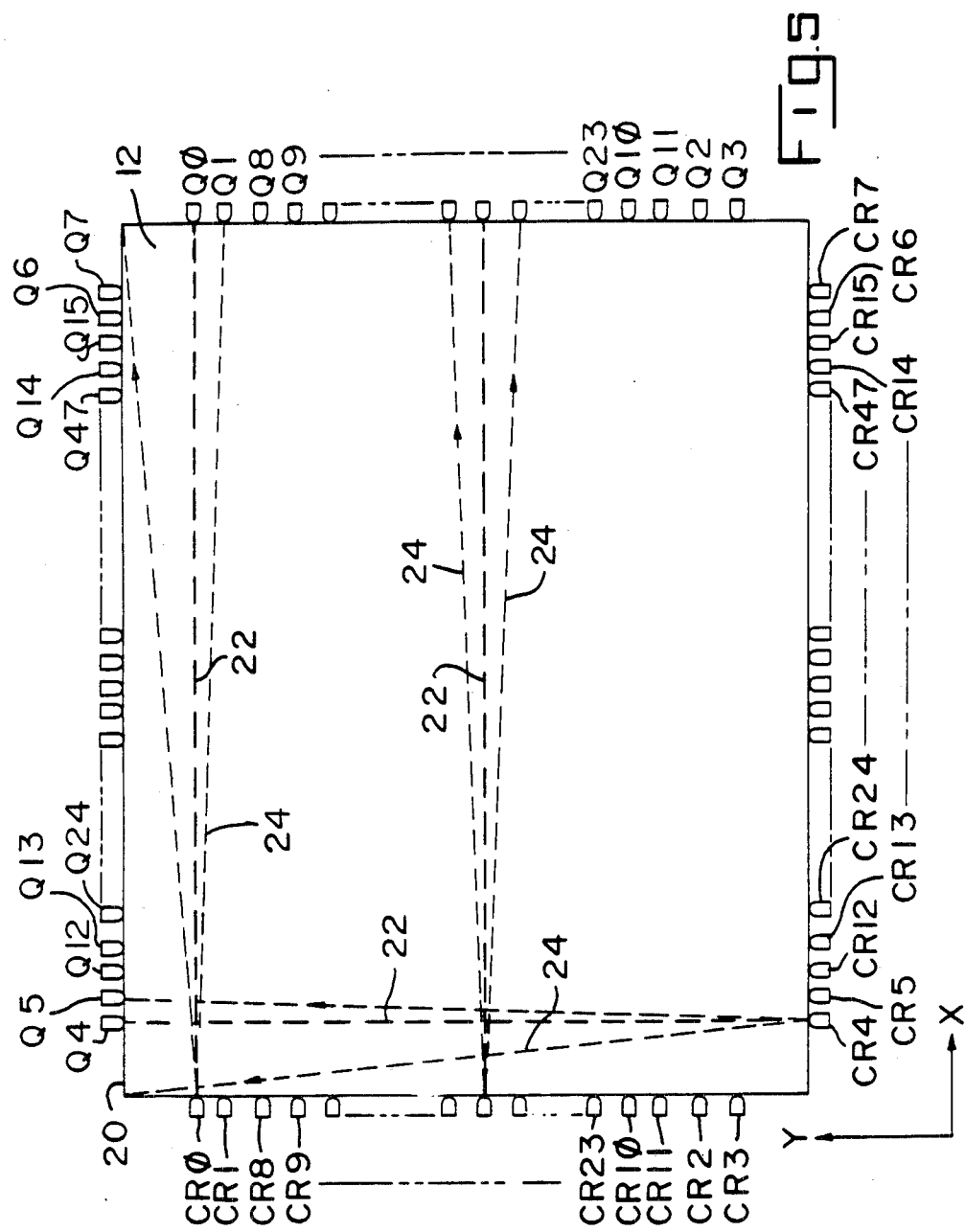
FIG. 5 is a representational view of the frame surrounding the opto-matrix devices as well as a numbering assignment of the emitters and detectors of the present invention.
Figure 6:
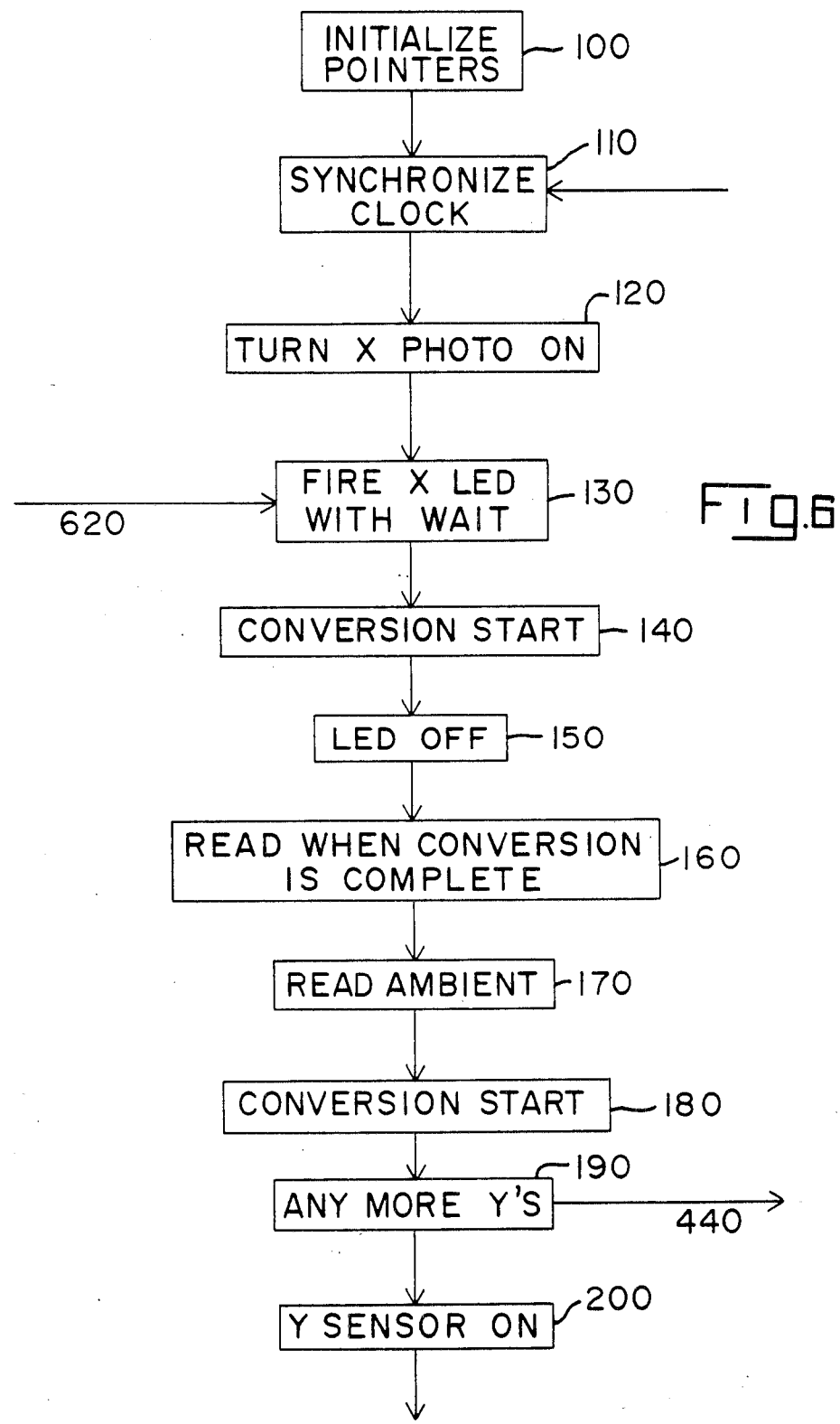
FIGS. 6 through 14 are flow chart diagrams for use with the preferred embodiment of the present invention.
Figure 7:
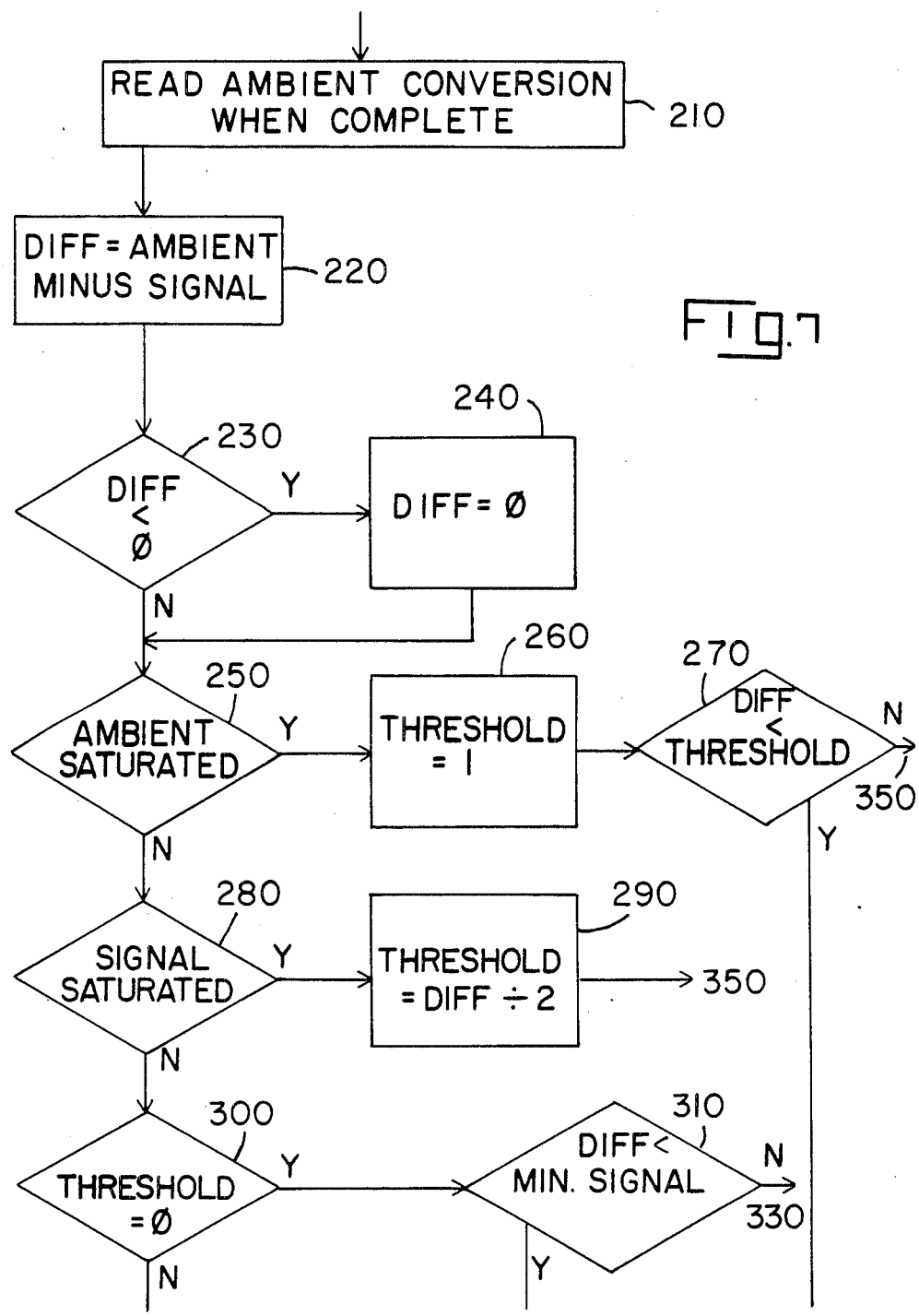

Referring now to FIG. 5 there is illustrated a diagrammatic representation of an opto-matrix frame and a bezel (20). Shown are emitters CR0 through CR47 and detectors Q0 through Q47 which comprise a 16×32 matrix with 16 emitters and detectors in the Y or vertical direction and 32 emitters and detectors in the X or horizontal direction. It is to be understood that although not shown the emitters and detectors are fixedly mounted on a printed circuit board or the like for properly holding and aligning an emitter/detector pair. Also diagrammatically illustrated is the light pattern produced by an emitter and which is received by a detector. Each emitter when energized, from a diagrammatic standpoint, can be said to produce a principal light beam pattern shown generally at 22 with non-collimated light 24 dispersing further and further apart, the more distant the detector is from the emitter.

OPERATION OF THE PRESENT DEVICE

Referring now to FIGS. 2, 3 and 4, the overall electrical operation of the present invention will be discussed. It is to be remembered that the present invention interacts with a host computer (not shown) which allows a CRT to present information over a video display area 12 which is part of an interactive relationship between the operator 16 and a program or operation such that the opto-matrix touch input screen designates operator decisions to the host computer. It is submitted that the host computer and the programs used with it are within the scope of one skilled in the art and therefore are not discussed in detail below. The host computer introduces a clock signal to the clock terminal of FIG. 2, which is received by the C port I/O line PC5 and the interrupt terminal of the microprocessor U2. This clock stream produced by the host computer continues for as long as input from the opto-matrix frame may be desired with the result that upon the absence of a clock signal, an interrupt is initiated in the microprocessor U2. Accordingly, upon appropriate power up and the presence of clock signals to the microprocessor U2, the opto-matrix device begins a scan-type of sequence which causes the LED's to be fired, phototransistors to be read, and internal analysis of the information by appropriate software. It is to be understood that early fault detection may operate as a subroutine of a basic operating system (FIGS. 6 through 14) or as a separate diagnostic program or routine (FIGS. 16 through 19). Accordingly, in order to present a clear overview of the entire operating system and since the operation of the present device is cyclical in nature, a single cycle will be discussed by way of example with early fault detection operated as a subroutine. Thereafter, early fault detection as a separate diagnostic routine will be discussed. Since a single cycle will be discussed, it is to be understood that the remainder of the routines perform in the same manner.

Figure 8:
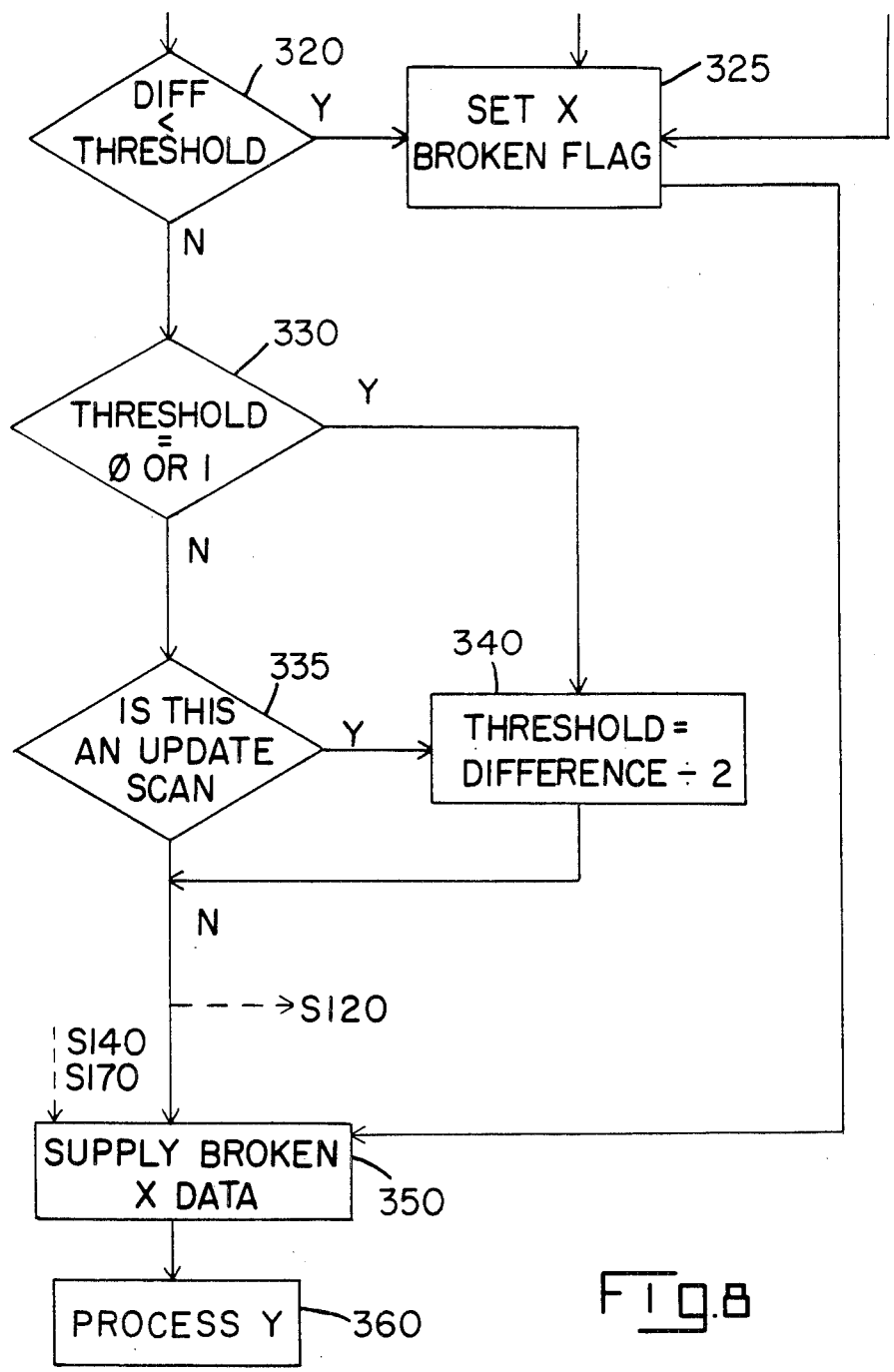
Figure 9:
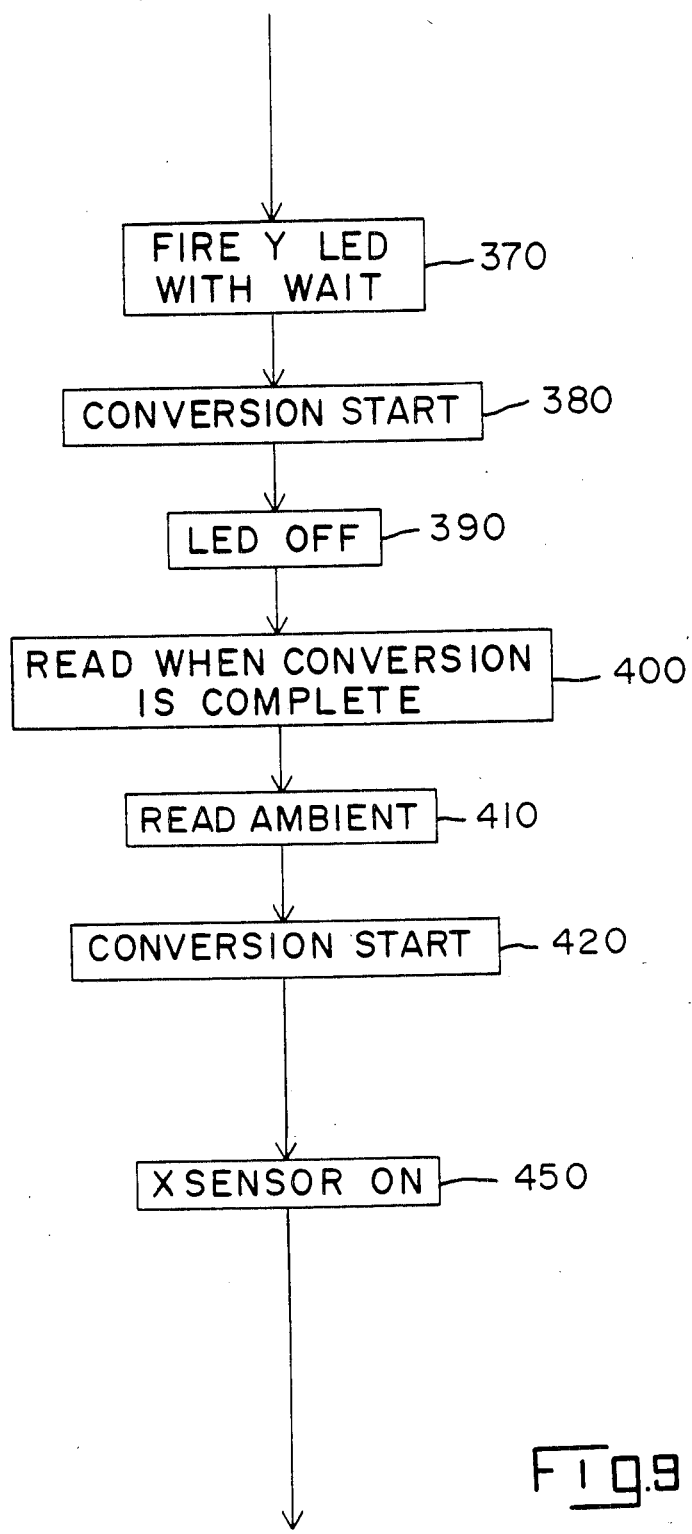
Figure 10:
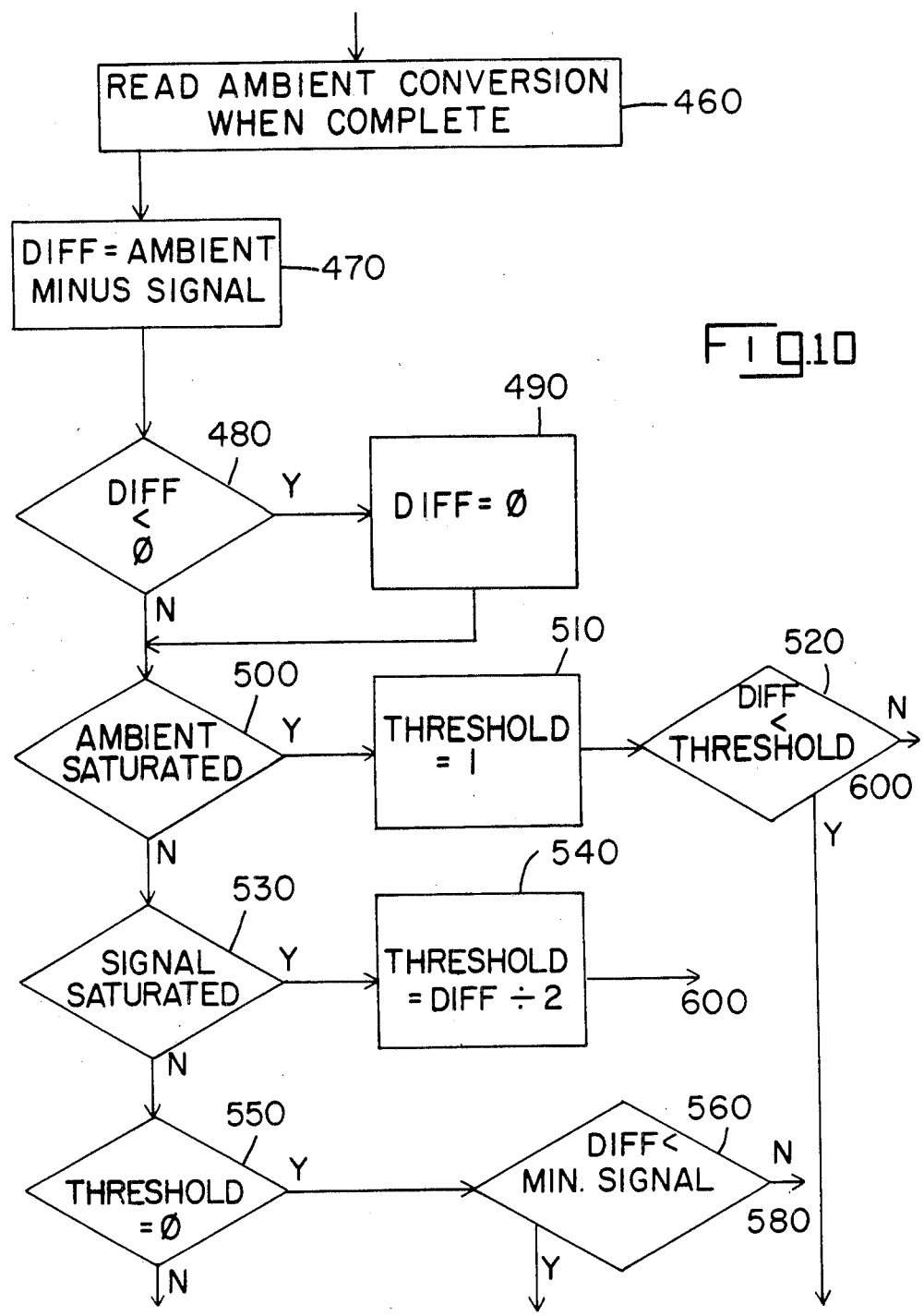
Figure 11:
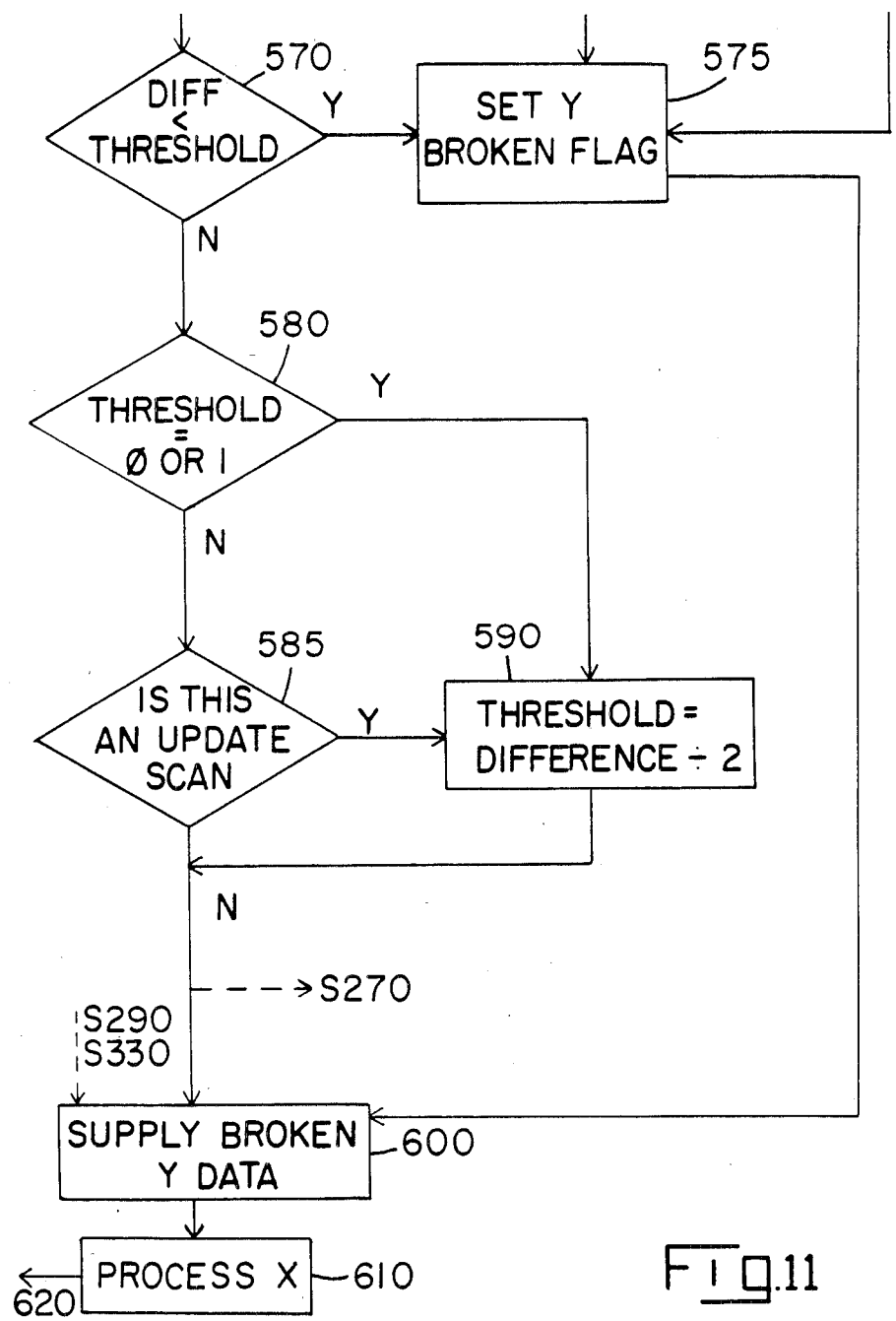
Figure 12:
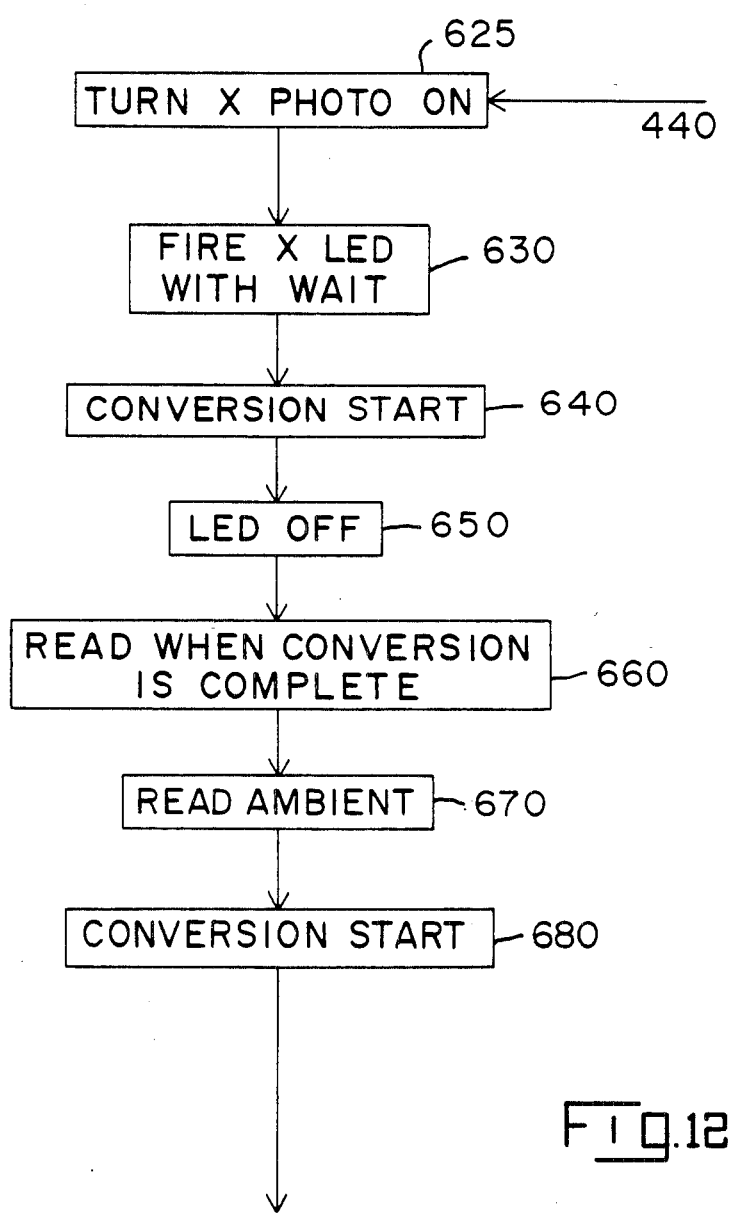
Figure 13:
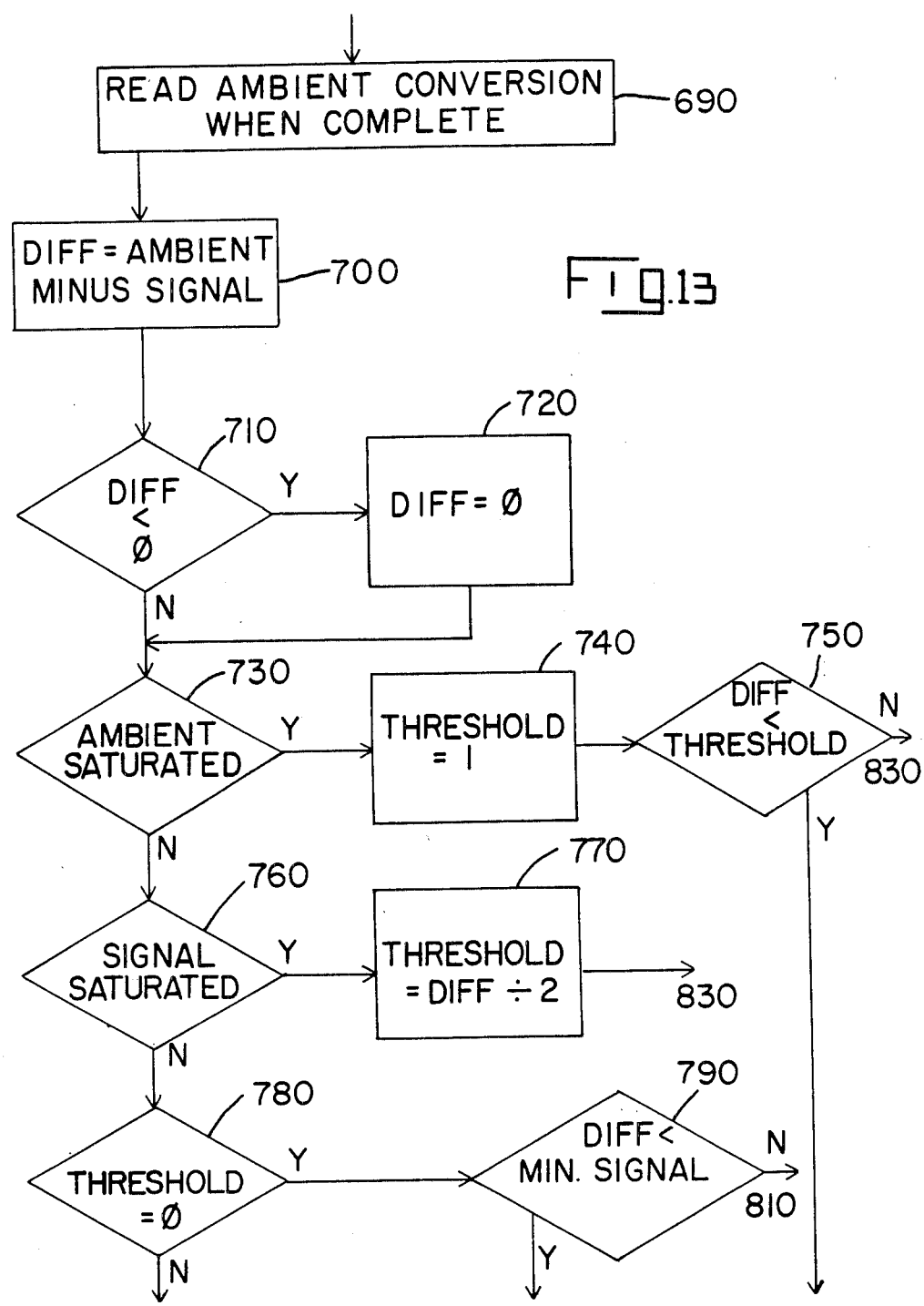
Figure 14:
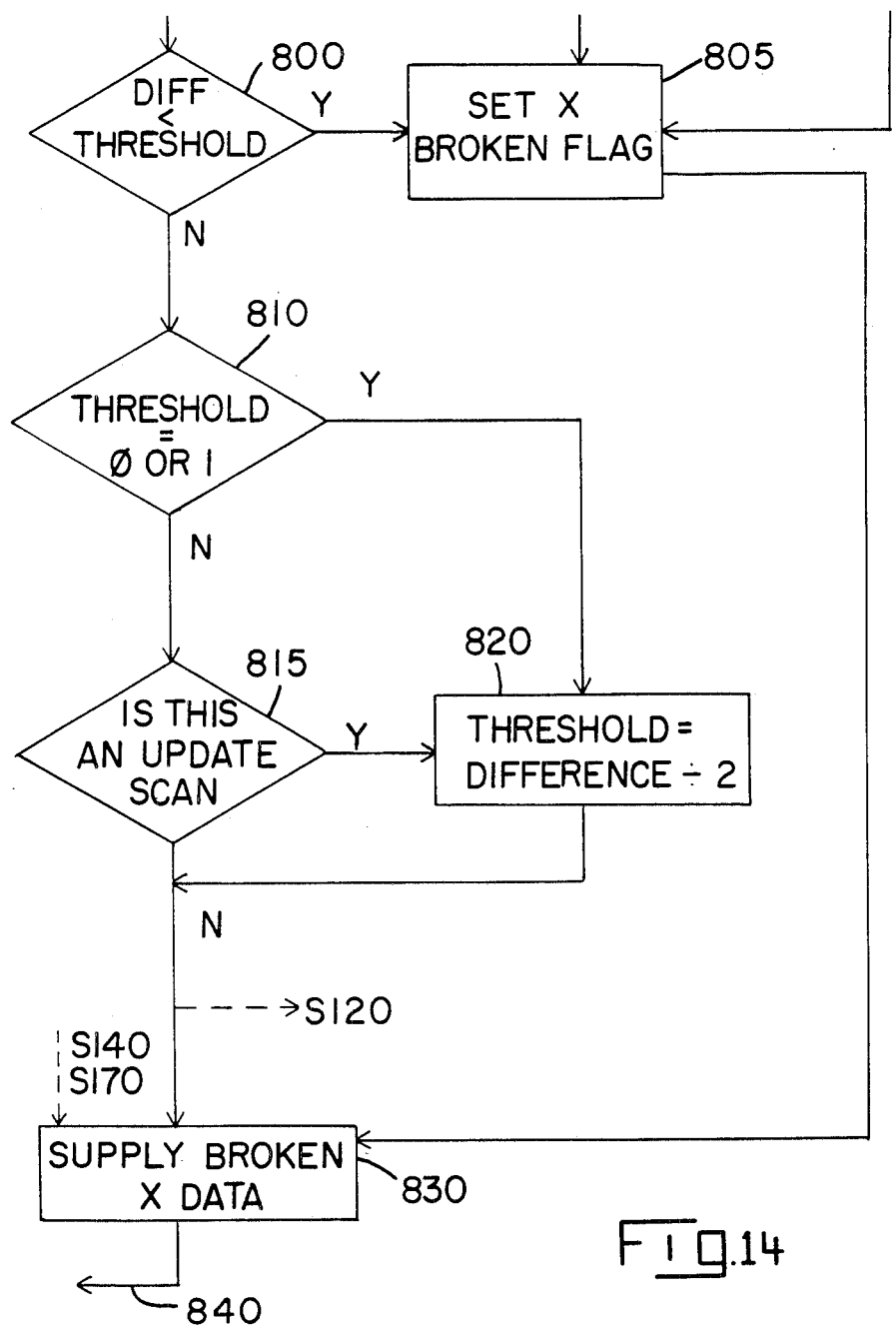

Upon power up of the microprocessor U2, a main program loop is initiated in software (FIGS. 6 through 14 and 16 through 19). It is submitted that the flow chart diagrams illustrated in FIGS. 6 through 14 and 16 through 19 taken together with the description of the preferred embodiment herewith are sufficient so as to enable one skilled in the art to write the appropriate software. This starts with the initialization of the pointers at 100, which thereby begins the X and Y beam count at a known start point of zero. Thereafter, the microprocessor waits for a preset number of synchronizing clock pulses at 110 which are received from the host computer thereby insuring complete synchronization between the microcomputer U2 and the host computer. An X phototransistor at 120 is then turned on which would be Q4 (FIG. 5) as the start of the initial cycle in the present example. This turning on of the phototransistor allows the transistor to settle down or stabilize. This is accomplished by selecting the appropriate address for I/O lines PC0, PC1 and PC2 which are presented to decoder U7 which is then enabled by I/O line PC3 which thereby allows current to flow through Q4. The LED CR4 is then fired by energization of I/O line PB0 in conjunction with the address presented by PC0, PC1 and PC2 along with the enabling I/O line PB7 which thereby enables line 4 of decoder U5. This firing of the X LED CR4 at 130 also takes into account a wait period so as to insure that the LED CR4 is completely turned on. Resistor array R3 is provided as a pull up resistor network to insure that each emitter has minimum proper power for firing. Accordingly, when CR4 is fired, current is caused to flow through the emitter of the lower Darlington transistor pair of array U3 which thereby drives a collector of Darlington transistor array U8 (used as a sync driver) such that the emitter is actively driven and the Darlington transistor array U8 and U9 are actively driven. After the LED CR4 is completely turned on a conversion is started at 140 which in this example dictates that analog-to-digital line AN0 takes the value produced by Q4 and starts to convert this value to a digital number. This digital number is determined by a reference value which is controlled by the reference divider of Vrh contained on the microprocessor U2 with all signal voltages being ratiometrically converted relative to this reference. It has been determined that this Vrh reference value should be set to Vq where Vq is the maximum voltage input and corresponds to a deselected phototransistor or to a selected phototransistor with an extremely low ambient light level. Resistor networks R6 and R7 determine the Vq maximum reference level. During the digital conversion process at 140, the LED CR4 is turned of at 150 with the digital conversion then completed and read and stored in the microprocessor at 160. With the LED CR4 off, another reading is taken of the phototransistor Q4 which results in a ambient light reading at 170 which is then started to be converted to a digital number at 180. Thereafter a count check is utilized at 190 to determine if there are any more Y's or Y phototransistors to interrogate. This is done since X and Y phototransistors are sampled alternately and since there are less devices in the Y direction than the X, for the purpose of expeditious processing, when the maximum number of Y devices have been sampled, the remainder of the X devices are sampled starting at 440 and described more fully below. Accordingly, in the present example there are more Y phototransistors to be sampled with the result that Y phototransistor Q0 is turned on at 200. Thereafter, at 210 the ambient conversion of the X phototransistor Q4 which was read at 170 is completed with the signal subtracted from the ambient value to produce the difference at 220. This, therefore, compares the read converted value at 160, which is the fired LED CR4 value, with the ambient value at 170 where CR4 was off, subtracting the two to determine the difference which is then presented to 230. A comparison is then made at 230 to determine whether the difference was less than zero (0). If this difference was less than zero, then a YES condition exists which is presented to 240 with 240 defining the difference as equal to zero thereby eliminating negative values and which is thereafter presented to 250. If the difference is not less than zero at 230, then a NO condition exists which is then presented to 250. At 250 another comparison is made to determine whether the ambient value read was the result of a fully saturated phototransistor Q4. This is necessary since all light sensitive devices of this type produce a changing value for changing light conditions until that point, defined as saturation, where the output of the light sensitive device, such as phototransistor Q4, does not change with an increase of light into it. If the ambient value of phototransistor Q4 is determined at 250 to be in a saturated condition, then a YES will exist which is then presented to 260. At 260, a new threshold is assigned as being equal to 1 which is then presented to 270. A threshold level is defined as that level above or below which phototransistor Q4 readings will be considered as non-broken or broken respectively. Accordingly, a threshold level is computed for each emitter/detector pair with the result that, in the present system size, 48 threshold levels are computed. This, therefore, allows for custom tailoring from beam to beam so as to compensate for component-to-component differences and which result in a more flexible system. Otherwise, it has been found that if one threshold level is preset, then statistical errors will occur. This threshold level is updated after a preset number of scan cycles which may vary but is preferably every 256 scans of the opto-matrix frame, although possibly earlier if called for (as discussed more fully below). At 270, another comparison is made to determine whether the difference from 220 is less than this new threshold. If the difference is less than the threshold, then a YES condition exists which is then presented to 325 so as to indicate a broken flag for X which, in this case, would indicate that a stylus has broken the light between phototransistor Q4 and LED CR4. If, however, at 270 the difference is not less than the threshold, then a NO condition exists which is then presented to 350. If the ambient value of Q4 is not a saturated value at 250, then a NO condition exists. This is presented to 280 which thereafter determines whether the signal value, that is the value at 160 where LED CR4 was fired and, therefore, the light received by phototransistor Q4, taken together with the ambient, was at the point of or in excess of saturation limits. If a saturated condition was present, then a YES condition exists which is then presented to 290 which now determines a new threshold value by dividing the difference from 220 by 2. This new threshold is then presented to 350. If the signal was not a saturated value at 280, then a NO condition exists which is then presented to 300 to determine whether the threshold is equal to zero. If the threshold was equal to zero, then a YES condition exists which is presented to 310. The threshold at 310 is determined by dividing the difference by 2. The use of utilizing 2 as the denominator in the threshold equation is for the purpose of providing an engineering margin by a factor of 2, thereby indicating that signals between broken and non-broken are separated by a factor of 2. If at 300 the threshold is determined as being equal to zero, then a YES condition exists which is presented to 310 which then determines whether the difference from 220 is less than the minimum acceptable signal level. This signal level is an engineering constant and may fluctuate with different designs and different devices which are utilized much the same as the use of 2 as a denominator for determining the threshold at 300. If this difference is greater than the minimum signal value, then a NO condition exists which is then presented to 330. However, if the difference is not greater than the minimum signal value, then a YES condition exists which thereby indicates that a broken beam is present or a stylus has been interposed between LED CR4 and phototransistor Q4 which is then presented to 325 to set a broken flag condition. If the threshold is not equal to zero at 300, then a NO condition exists which is presented to 320 which determines if the difference from 220 is less than the previously calculated threshold. If the difference is less than the threshold, then a YES condition exists thereby indicating a broken beam and is presented to 325 as a broken flag condition. If the difference at 320 is not greater than the threshold, then a NO condition exists which is presented to 330. Block 330 is used to check to see if a threshold level has ever been set, which would occur during the first scan cycle. If the threshold value is equal to zero or 1, thereby indicating the level had not previously been set, then a YES condition exists which is then presented to 340 which now defines a new threshold as equaling the difference from 220 divided by 2. However, if the threshold at 330 is not equal to zero or 1, then a NO condition exists which is presented to 335. Accordingly, a new threshold is only calculated after a preset number of cycles, preferably 256, unless it is specifically redefined earlier as in block 290. Therefore, when a threshold value is used for comparison purposes, the most recently updated threshold value is used, which may have been 255 cycles previously. At 335, a comparison is then made to see whether the particular scan is an update scan. This is utilized so that a threshold is not generated during each and every scan cycle but is done at predetermined intervals such as, for example, every 200 cycles. If this is an update scan at 335, then a YES condition exists which is then presented to 340 so as to define a new threshold. At this pont, the results of block 335 and 340 are presented to one of two different places. If early fault detection is to be utilized during normal system operation, then the results of blocks 335 and 340 are presented to subroutine block S120 (FIGS. 16 through 19). Thereafter, early fault detection analysis is performed with the results of subroutine blocks S140 of S170 presented to block 350 (FIG. 8). In this manner, the use of early fault detection may be accomplished in two different areas. The first is as a normal subroutine of the operating system or as a separate routine which may be done as part of an automatic or user-initiated diagnostic routine. Since early fault detection may be operated as a separate diagnostic routine, the actual operation and usage will be described more fully below. Accordingly, upon presentation of the inputs to block 350, all hits from the X-axes are presented as output data (as described more fully below).

Processing of the Y axes is then started at 360 essentially identical to that of the X axes. This results in the Y LED CR0 being fired for a sufficiently long duration of time at 370 to insure complete LED turn-on with a digital conversion of Q0 started at 380. This conversion at 380 is possible since the Y sensor Q4 was turned on at 200. This seemingly early sampling of Q0 is done since the crystal which determines the frequency at which the microprocessor U2 runs is substantially greater than the clock rate or the data output rate (discussed below) thereby using dead time. Thereafter LED CR0 is turned off at 390 with the value received by Q0 read when the conversion is complete at 400. Upon completion of the conversion the ambient value of Q0 is determined at 410 with the conversion to a digital number started at 420. Immediately after the start of the digital conversion at 420, the next X sensor which is Q5 is turned on at 450. During the Q5 turn on period the ambient converted value Q0 is read when completed at 460 with the difference being computed as the ambient value minus the signal value determined during the firing of LED CR0 at 470. This value is then presented to 480 to determine whether the difference value is less than zero with a NO or YES condition being presented to 490 or 500 respectively. Thereafter, in a manner indentical to that of the X beam in FIGS. 7 and 8, the same manipulation of values is accomplished. However, the breakouts for the early fault diagnosis subroutine, although departing from the same functional areas, would be presented to S270 and returned from the subroutine from S290 or S330. The result of 600 is thereafter presented to 610. At this point a processing of an X coordinate emitter/detector pair is initiated at 610 and presented as 620 to begin again at block 130 which fires the next X LED CR5 with a repetition of the processing as mentioned for FIGS. 6 through 11. In this manner, toggling is accomplished between the X and Y axes until at box 190 it is determined that there are no more Y's to be interrogated which is then presented as a jump via 440 to box 625 which thereafter turns on the 17th X axis phototransistor, Q36. X axis LED CR36 is then fired at 630 with the process then continuing in a manner substantially identical to the previously discussed X and Y axes processing. Thereafter at box 830 the X data is presented at 840 to 110 with the process then repeating as long as the host computer continues to send out a clock signal.

It is to be remembered that during this entire time frame the host computer upon receiving a synchronization signal from microprocessor U2 in a data stream (described more fully below) is required to know in advance the size of the touch input matrix and to keep track of the data stream so as to know which X and Y pair status is being given.

Accordingly, at 350, 600 and 830 data which represents an X or Y broken or non-broken status condition is presented onto the data line.

Referring now to FIGS. 16 through 19, there can be seen a flow chart diagram for use as a subroutine or as a separate diagnostic for early fault detection of the present invention. As mentioned previously, the use of early fault detection may be accomplished as a stand-alone diagnostic, in which case the entire set of FIGS. 16 through 19 would be utilized, or only a portion of FIGS. 17 and 19 as mentioned previously and as described more fully below. Upon initialization of the diagnostic scheme, the subroutine is initialized so as to set to beam 1 at block S10 thereby addressing X phototransistor Q4 and X LED CR4. The phototransistor Q4 is then turned on with wait so as to allow the transistor to settle down or stabilize. The first part of the diagnostic routine is therefore essentially identical to the manner of use during a normal operating system. Accordingly, the appropriate address for I/O lines PC0, PC1 and PC2 which are presented to decoder U7 which is then enabled by I/O line PC3 which thereby allows current to flow through Q4. The LED CR4 is then fired by energization of I/O line PB0 in conjunction with the address presented by PC0, PC1 and PC2 along with the enabling I/O line PB7 which thereby line 4 of decoder U5. This firing of the X LED CR4 at S30 also takes into account a wait period so as to ensure that the LED CR4 is completely turned on. Thereafter, when CR4 is fired, current is caused to flow through the emitter of the lower Darlington transistor pair of array U3 which thereby drives a collector of Darlington transistor array U8 (used as a sync driver) such that the emitter is actively driven and the Darling transistor array U8 and U9 are actively driven. After the LED CR4 is completely turned on, a conversion is started at S40 such that the analog-to-digital line AN0 takes the value produced by Q4 and starts to convert this value to a digital number. This digital number is determined by a reference value which is controlled by the reference divider of Vrh contained on the microprocessor U2 with all signal voltages being ratiometrically converted to this reference. During the digital conversion process S40, the LED CR4 is turned off at S50 with the digital conversion then completed and read and stored in the microprocessor at S60. With the LED CR4 off, another reading is taken of the phototransistor Q4 which results in an ambient light reading at S70 which is then started to be converted to a digital number at S80. Thereafter, the ambient conversion value is read at S90 and stored into the microprocessor and which is then presented at S100 so as to determine the difference which is essentially the ambient minus signal value similar to block 220, 470 and 700 of FIGS. 7, 10 and 13 respectively. The difference or result of S100 is then presented to S120 which compares whether the difference value is less than a constant value defined as constant 1 (CON1). This constant value is an engineering constant which is preset according to the type of CRT or operating system in which the present device is utilized and may take into account factors such as the type of phototransistors or LED's utilized as well as the general ambient light conditions to be inspected. Accordingly, difference is compared at S120 to see whether the difference value, which is the difference between the ambient reading of phototransistor Q4 and the signal reading of Q4 or the value or light sensed by Q4 as a result of ambient light and the firing of LED CR4, is not less than the first constant. If it is not, then a NO condition exists which is then presented to S140. However, if this difference is less than the constant, a YES condition is presented to S130 which thereby indicates that a bad beam is present. This is done since that the difference value should at all times be no less than the signal value which is presented when LED CR4 is fired (assuming no ambient light, such as a completely dark room, is present). If a bad beam is indicated at S130, the output of S130 is then presented to S170 which sets a warning flag so as to notify the system that either an LED, a phototransistor, or the circuitry associated with either one of the two is defective or that dirt is simply present either on the transistor or emitter or the bezel itself, thereby warranting further analysis by a repairman. Thereafter, if a NO condition has existed at S120, the difference is then compared at S140 to see whether the difference value is less than a second constant CON2. This second constant level is also an engineering level. If the difference is not less than constant 2, then a NO condition exists, while if the difference is less than this second constant level CON2, then a YES condition exists which thereby is presented to S150 so as to indicate a marginal beam. If a marginal beam has been indicated at S150, it is then presented to S170 which thereby sets a warning flag. When a warning flag has been set, it is then presented to S160 and similarly, if the difference is not less than constant 2 in S140, a NO condition is then presented to S160. In the event that early fault detection of the present invention is utilized as part of the normal operating system as mentioned earlier, then blocks S120, S130, S140, S150 and S170 would be utilized with the outputs of S140 and S170 then being presented to 350 of FIG. 8. In this manner, the subroutine is entered into at S120 and exited at S140 or S170 and thereafter presented to 350. If the NO result of S140 is presented to S160, then a comparison is made at S160. This is essentially a count check which is utilized to determine if there are any more Y's or Y phototransistors to interrogate. This is done since, as mentioned previously, X and Y phototransistors are sampled alternately and since there are less devices in the Y direction than in the X, for purposes of expeditious processing, when a maximum number of Y devices have been sampled the remainder of the X devices are sampled. If there are no more Y devices which are to be sampled, then a NO condition exists which is then presented to S320 while if there are more Y devices to be sampled, then a YES condition exists which is then presented to S180. Accordingly, in the present example, there are more Y phototransistors which are to be sampled since only the first X pair have been sampled. Therefore, Y phototransistor Q0 is turned on at S180 and thereafter LED CR0 is turned on at S190. Thereafter, in a manner essentially identical to the X axes, the various values are isolated and compared. Further, in a manner similar to that for the X axes, if early fault detection is used as a pure subroutine of the main operating system, then blocks S270, S280, S290, S300 and S330 are utilized with the results of S290 and S330 being presented to block 600 of FIG. 11. If, however, a NO condition did exist at S290, block S320 then determines whether any more X beams are to be sampled. If there are no more X beams to be sampled, then a NO condition exists which is then presented to S310 thereby indicating the routine is done, while if there are more X beams to be sampled, a YES condition exists which is then presented to S340. Block S340 then increments the count so as to set the count to the next beam which is then initiated at S20 thereby starting the process all over. In this manner, X and Y axes photodetectors and emitters are alternately sampled and analyzed until there are no more Y axes devices to be sampled and analyzed in which case the remaining X devices are consecutively sampled.

In the event that bad or marginal beams have been indicated and warning flags have been set, then these conditions may be indicated to a user or repairperson. In this manner, the operation of the present system may be tracked and is particularly helpful where device degradation results in marginal beam indications. This thereby would allow a system user to repair or replace any defective components at a convenient time as opposed to experiencing system or device failures during critical modes of operation. Additionally, the warning flags may be repeatedly stored so as to indicate devices which are intermittent between acceptable and unacceptable limits or become unacceptable during certain operating conditions. Further, the engineering constants of FIGS. 17 and 19 may be changed so as to more effectively tune the system. For example, a bad beam might be indicated only where the difference value indicates a relative output from a phototransistor of perhaps 0 to 100 millivolts while a marginal beam might be indicated as an output from a phototransistor of 100 to 250 millivolts. Additionally, more indicators may be utilized so as to more accurately determine the status of an emitter/detector pair whereby a phototransistor output could be divided up into ten segments ranging from acceptable to bad or unacceptable.

Figure 15:
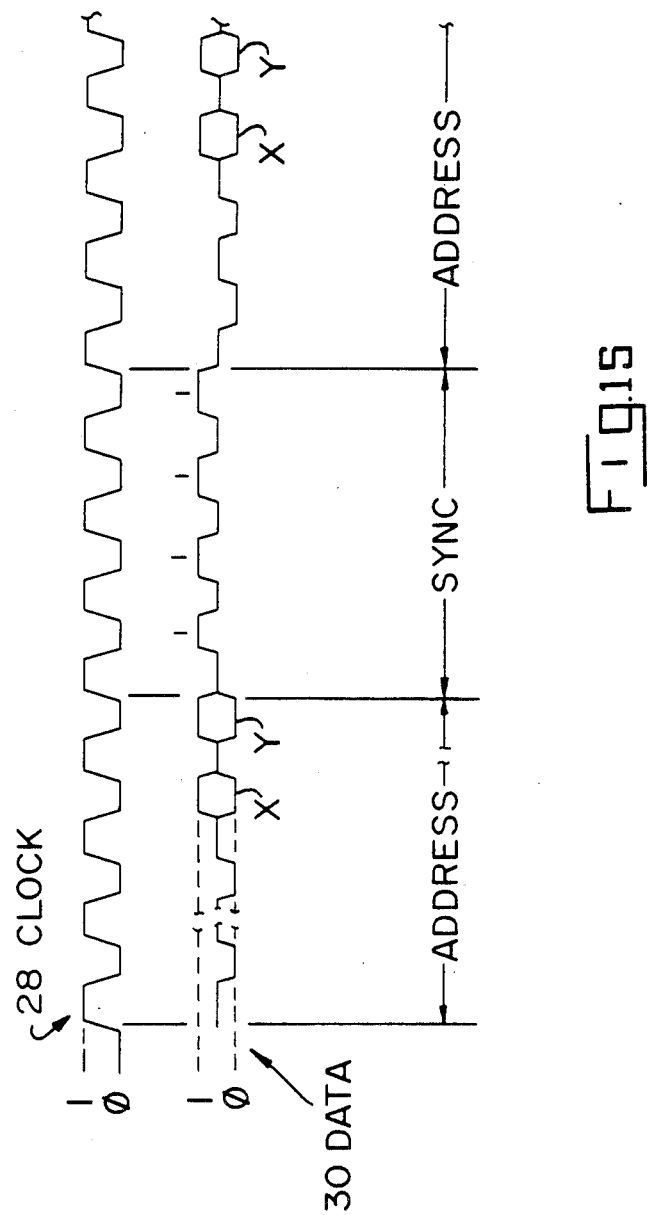
FIG. 15 is a timing diagram of the data output for use with the present invention.
Figure 16:
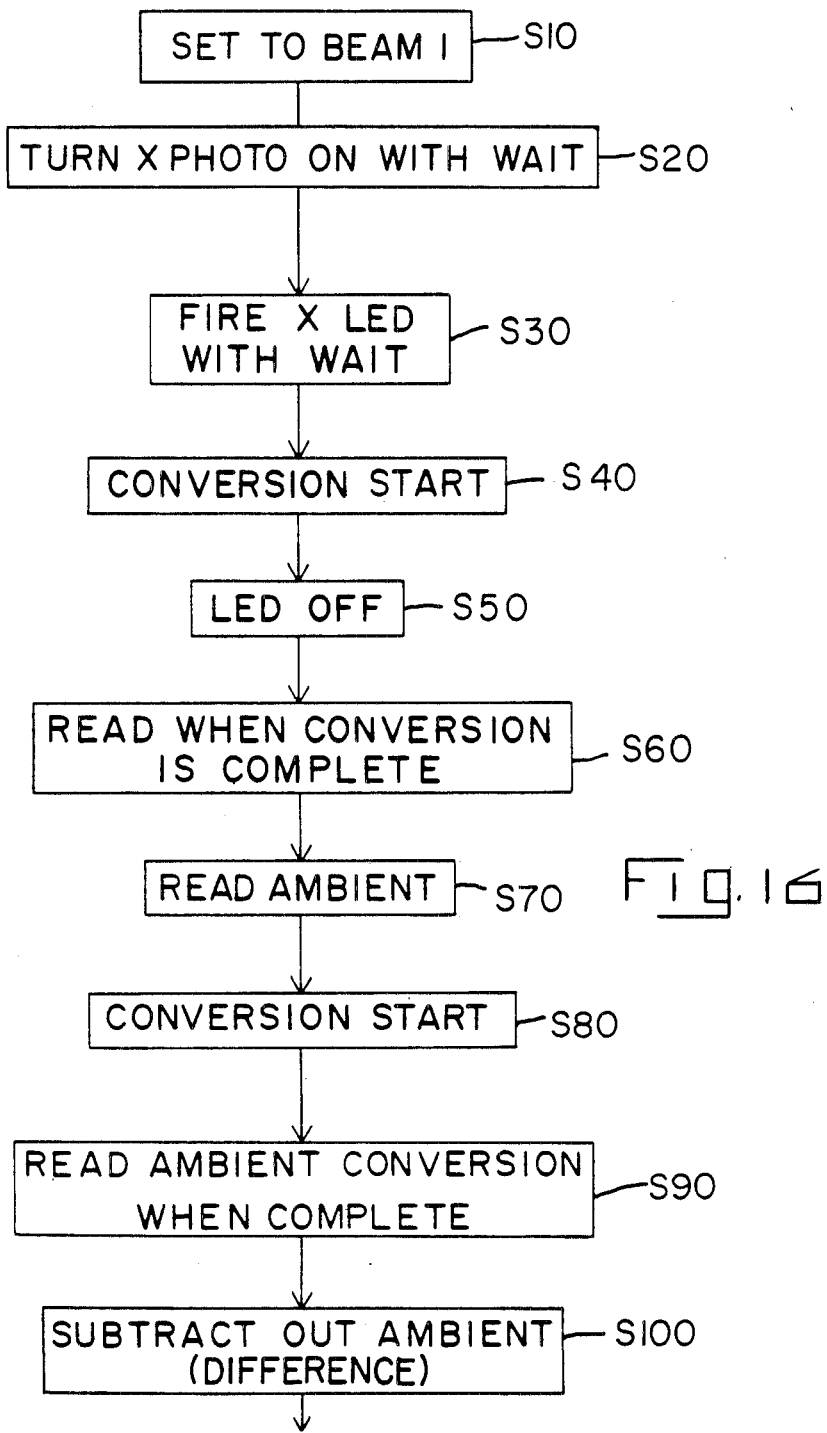
FIGS. 16 through 19 are a flow chart for use as a subroutine for use with the present invention.
Figure 17:
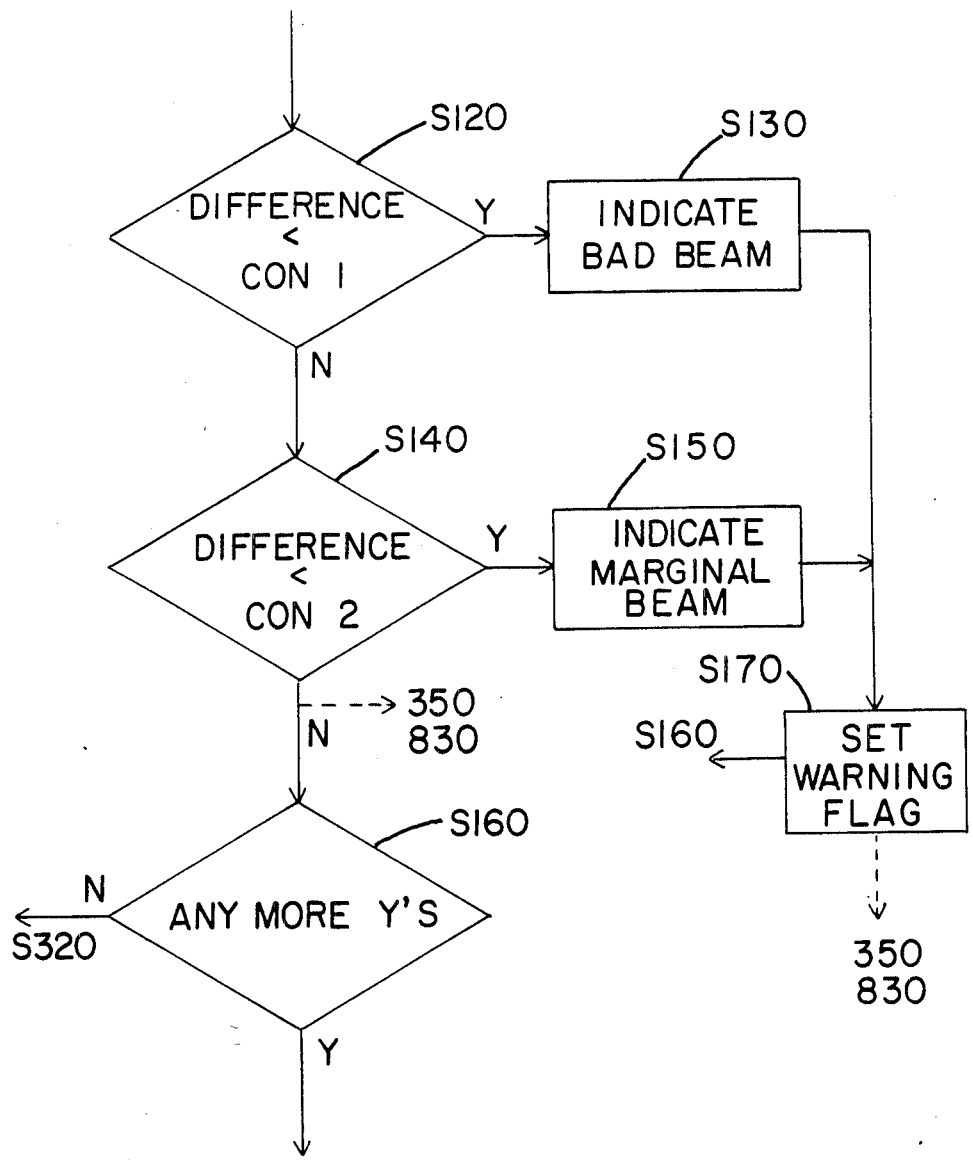
Figure 18:
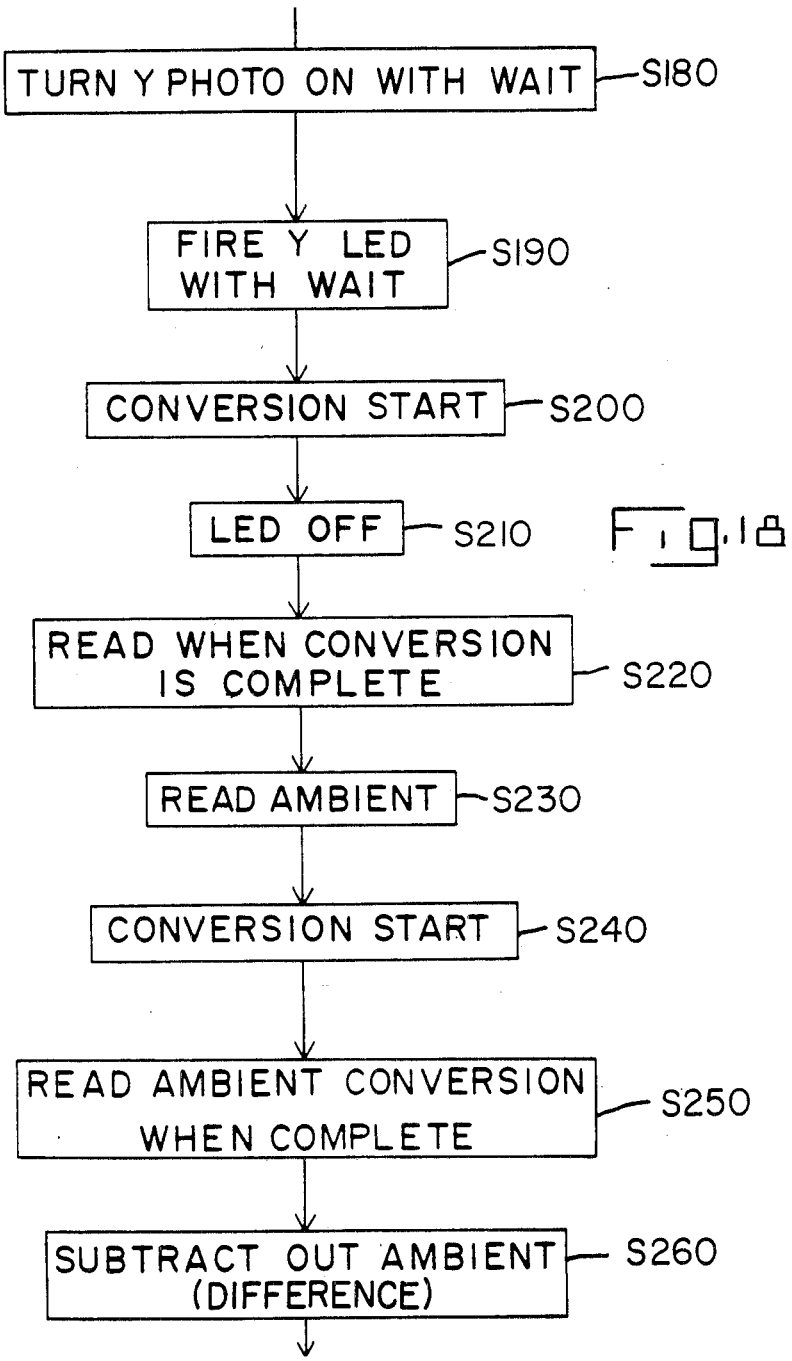
Figure 19:
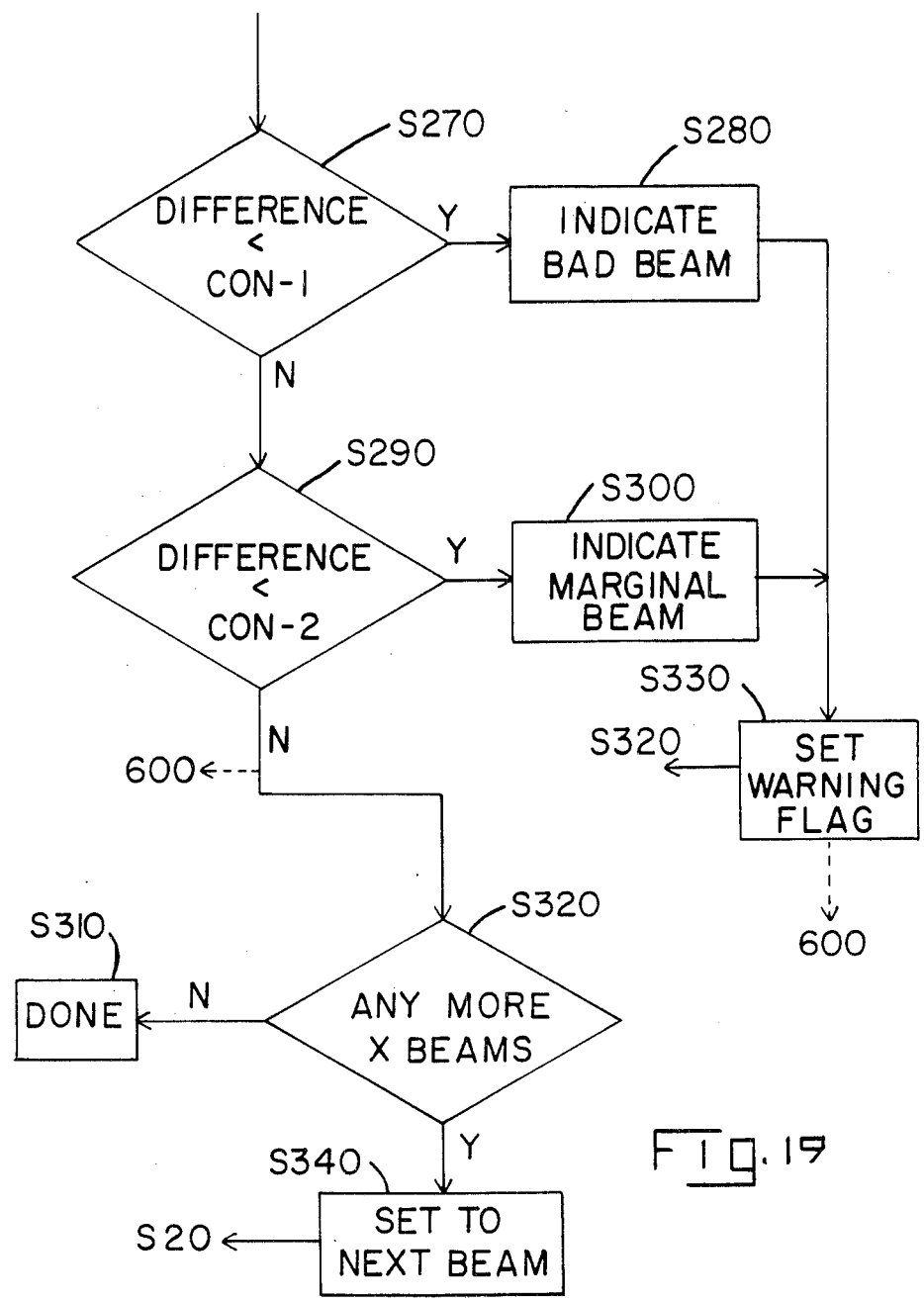

Referring now to FIG. 15 there can be seen a timing and data scheme for the present invention. Upon initialization and synchronization at 110 of FIG. 6 four continuous ones are placed onto the data line for the host computer to receive. This thereby lets the host computer know that a synchronization frame has occurred and that the host computer should now start to count. Thereafter, the data is presented in 4-bit bytes with the first two bits preferably being zero and the third and fourth bits indicating broken or non-broken conditions for the X and Y axes respectively. If a broken condition does exist, then a 1 is placed onto the data line and if an unbroken condition exists, than a 0 is utilized. As an example, should a hit occur at the intersection of CR0 and CR4 and since these are the first X and Y pairs interrogated, the first 4-bit byte of data after synchronization will read (0011). However, had a hit occurred at the intersection of CR0 and CR5, then the first 4-bit byte would have contained (0001) and the second 4-bit byte would have contained (0010). For those frames where no Y axis detector is being interrogated, a 0 is preferably inserted as a false bit although a 1 may also be utilized. This 4-bit byte data stream is continued until all the X detectors have been interrogated with the microprocessor U2 sending out the 4-bit sync cycle at the end of the interrogation thereby indicating a new cycle or frame. Additionally, the present device will allow for beam averaging, the disclosure of which may be found in U.S. Pat. No. 4,267,443 "Photoelectric Input Apparatus", issued May 12, 1981 to Carroll et al, incorporated by reference herein, and which allows for a stylus between two emitters to be registered as a hit between two beams thereby effectively doubling the resolution or interpolation of the present system to a 32×64 matrix. Should a warning flag be indicated as a result of early fault detection, then a number of schemes may be utilized, and which are readily within the knowledge of one skilled in the art. These may be accomplished, for examle, by a bit stream which alternates between the operating system bit stream and the fault detection bit stream wth the data instead of presenting a broken or non-broken condition presenting a marginal or bad beam condition. This would therefore result in a bit stream of hits or non-hits followed by a second bit stream of bad or marginal beams. Also, the first two bits of the four-bit bytes in the data stream might indicate bad or marginal beams much in the same way that broken or non-broken conditions are indicated.

It is to be remembered that many variations of the present invention may be accomplished without departing from the spirit and scope of the present invention. The program could be utilized in a different sequence without departing from the spirit and scope of the present invention. Also, other data streams may be utilized such as parallel output using additional I/O lines which are available or different types of serial data streams. Additionally, different types of arrays other than Darlington transistors may be utilized while different types of decoders may be used while other types of detectors such as photodiodes may be used. It is also to be remembered that the firing or detection order of the emitters and detectors may be changed to any order desired. The present device may also be used with or without a display or a CRT or with a flat panel display.

We claim:

1. An opto-matrix touch input device comprising:
   a four-sided frame;
   optical emitters disposed in two adjacent sides of said frame;
   optical detectors disposed in the two sides of said frame opposite said emiters, corresponding emitters and detectors forming an emitter detector pair;
   sequencing means for sequentially activating said optical emitters and associated optical detectors;
   means for sampling the amount of light received by said detectors and producing an analog electrical signal indicative of the amount of light received by the detectors;
   converter means for converting said analog signal representing the light received by said detectors to a digital value; and
   processor means connected to said converter means and said sequencing means for comparing the digital value corresponding to the output of an optical detector to a digital reference value thereby indicating the degradation or failure of individual emitter detector pairs.

2. The opto-matrix touch input device of claim 1 further comprising means for activating the detectors alone to generate a digital signal indicative of the amount of ambient light incident upon the optical detectors.

3. The opto-matrix touch input device of claim 1 wherein the processor means comprises means for comparing the difference between the digital value corresponding to the analog electrical signal indicative of the amount of light received by the detectors and the digital signal indicative of the amount of ambient light incident upon the optical detectors with the digital reference value to indicate the degradation or failure of individual emitter detector pairs.

4. The opto-matrix touch input device of claim 1 wherein the processor means further comprises means for comparing the digital value of the analog signal representing the light received by said detectors with a reference value to detect the presence of a passive stylus between corresponding emitters and detectors.

5. The opto-matrix touch input device of claim 4 wherein the processor means comprises means for indicating the degradation or failure of individual emitter detector pairs both independently of and in conjunction with detection of the presence of a passive stylus between corresponding emitters and detectors.

* * * * *